(12) United States Patent
Okawa et al.

(10) Patent No.: US 7,630,156 B2
(45) Date of Patent: Dec. 8, 2009

(54) MAGNETIC RECORDING MEDIUM, RECORDING/REPRODUCING APPARATUS, AND STAMPER FOR MANUFACTURING A MAGNETIC RECORDING MEDIUM

(75) Inventors: Shuichi Okawa, Tokyo (JP); Kazuhiro Hattori, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/972,645

(22) Filed: Jan. 11, 2008

(65) Prior Publication Data

US 2008/0170324 A1   Jul. 17, 2008

(30) Foreign Application Priority Data

Jan. 13, 2007   (JP)   ............................. 2007-005252

(51) Int. Cl.
  G11B 5/09   (2006.01)
  G11B 5/86   (2006.01)
  G11B 5/596   (2006.01)

(52) U.S. Cl. ..................... 360/48; 360/16; 360/77.08; 428/848.5

(58) Field of Classification Search ................ None
  See application file for complete search history.

(56) References Cited

U.S. PATENT DOCUMENTS

| 2006/0012903 A1 | 1/2006 | Asakura et al. |
| 2006/0012904 A1* | 1/2006 | Naruse et al. .................. 360/48 |
| 2006/0014053 A1 | 1/2006 | Asakura et al. |

FOREIGN PATENT DOCUMENTS

| JP | 2006-031855 | 2/2006 |
| JP | 2006-031856 | 2/2006 |

OTHER PUBLICATIONS

English language Abstract of JP 2006-031855.
English language Abstract of JP 2006-031856.
U.S. Appl. No. 11/972,868 to Takai et al., filed Jan. 11, 2008.

* cited by examiner

*Primary Examiner*—Andrew L Sniezek
(74) *Attorney, Agent, or Firm*—Greenblum & Bernstein P.L.C.

(57) ABSTRACT

On a rotary-type magnetic recording medium, servo patterns are formed in servo pattern regions on one surface and the other surface of a disk-shaped substrate by patterns including recording regions and non-recording regions. In the servo pattern regions on both the one surface and the other surface, plural functional regions are defined in order in a direction of rotation of the magnetic recording medium. In the pattern formed in at least one region out of the plural functional regions on the one surface, the non-recording regions are formed at formation positions on the one surface corresponding to formation positions of the recording regions on the other surface and the recording regions are formed at formation positions on the one surface corresponding to formation positions of the non-recording regions on the other surface.

7 Claims, 10 Drawing Sheets

MAGNETIC RECORDING MEDIUM, RECORDING/REPRODUCING APPARATUS, AND STAMPER FOR MANUFACTURING A MAGNETIC RECORDING MEDIUM

BACKGROUND OF THE INVENTION

1. Field of the Invention

The present invention relates to a rotary-type magnetic recording medium where servo patterns are formed in servo pattern regions on both one surface and another surface of a disk-shaped substrate by patterns with recording regions and non-recording regions, a recording/reproducing apparatus equipped with such magnetic recording medium, and a stamper capable of manufacturing such magnetic recording medium.

2. Description of the Related Art

As one example of a recording/reproducing apparatus equipped with this type of magnetic recording medium, Japanese Laid-Open Patent Publication No. 2006-31856 discloses a magnetic disk drive (hereinafter simply "disk drive") equipped with a double-sided patterned disk medium (hereinafter simply "magnetic disk") for perpendicular magnetic recording. On the magnetic disk provided in this disk drive, servo regions and data regions (hereinafter also referred to as "servo pattern regions" and "data recording regions") are provided with mirror symmetry on both the upper surface ("one surface") and the lower surface ("another surface") of a glass substrate. Annular magnetic tracks (so called "discrete tracks") are formed with a predetermined track pitch in the radial direction in the data recording regions of this magnetic disk. On this magnetic disk, magnetic tracks are formed by forming a recording layer (a magnetic layer) in convex shapes on an underlayer formed on the glass substrate, and non-magnetic guards (in this example, air) are provided between magnetic tracks that are adjacent in the radial direction.

In addition, a preamble portion, an address portion, and a burst portion (also referred to hereinafter as the "preamble pattern region", "address pattern region", and "burst pattern region") are provided in the servo pattern regions on the magnetic disk. Also, on this magnetic disk, in respective regions inside each servo pattern region (hereinafter, when no distinction is required, the respective regions inside a servo pattern region are referred to as "functional regions"), in the same way as the magnetic tracks inside the data recording regions, magnetic layers (hereinafter, referred to as "convex magnetic portions") are formed in convex shapes on the underlayer formed on the glass substrate and non-magnetic portions (in this example, air) are provided between adjacent convex magnetic portions so that a servo pattern is formed of "prebits". On this magnetic disk, the servo patterns are formed in the respective functional regions so that the formation positions of the convex magnetic portions and non-magnetic portions match one another on the one surface and the other surface of the glass substrate (i.e., both surfaces are mirror images of each other).

Note that the state referred to by the expression "the formation positions match one another" in the present specification refers to a state where the recording regions (i.e., convex magnetic portions) are formed at formation positions on the other surface (or the one surface) corresponding to the formation positions of the recording regions (convex magnetic portions) on the one surface (or the other surface) and the non-recording regions (i.e., non-magnetic portions) are formed at formation positions on the other surface (or the one surface) corresponding to the formation positions of the non-recording regions (non-magnetic portions) on the one surface (or the other surface).

Also, by applying a magnetic field in a direction so as to pass through the thickness of the magnetic disk during the manufacturing of this magnetic disk, the convex magnetic portions on the entire one surface and other surface of the magnetic disk are all DC magnetized (direct current-magnetized) in the same direction (in this example, from the one surface toward the other surface in the thickness direction of the magnetic disk). This means that on this magnetic disk, the convex magnetic portions on the one surface are DC-magnetized in the thickness direction from the surface of the magnetic disk toward the inside in the thickness direction, for example, and the convex magnetic portions on the other surface are DC-magnetized in the thickness direction from the inside of the magnetic disk in the thickness direction toward the surface. Accordingly, in a disk drive equipped with this magnetic disk, it is possible for a CPU to magnetically read a servo pattern from each servo pattern region (i.e., each functional region) on the one surface and the other surface via a magnetic head and extract servo data. By doing so, tracking servo control is carried out based on the extracted servo data.

SUMMARY OF THE INVENTION

However, by investigating the conventional disk drive described above, the present inventors found the following problem. In the conventional disk drive, as described earlier, the convex magnetic portions on the one surface and the other surface of the magnetic disk are DC magnetized in the same direction by applying a magnetic field in a direction that passes through the magnetic disk in the thickness direction thereof. This means that on this magnetic disk, the magnetized direction of the convex magnetic portions on the one surface when looking from the disk surface on the one surface-side and the magnetized direction of the convex magnetic portions on the other surface when looking from the disk surface on the other surface-side are opposed. Accordingly, in the conventional disk drive, on the one surface and the other surface of the magnetic disk, a magnetized direction of the convex magnetic portions on the one surface when expressed relative to the position of a magnetic head that is disposed on the one surface side of the magnetic disk to read and write on the one surface and a magnetized direction of the convex magnetic portions on the other surface when expressed relative to the position of a magnetic head that is disposed on the other surface side of the magnetic disk to read and write on the other surface are opposed. For this reason, the conventional disk drive is constructed so that when a magnetic signal is read from any of the one surface and the other surface of the magnetic disk, the CPU extracts the servo data by carrying out a polarity reversing process on a reproducing signal.

In a modern recording/reproducing apparatus (hard disk drive or the like), as the amount of data to be recorded and reproduced per unit time has increased, the number of rotations (i.e., rotational velocity) of the magnetic disk has become extremely high (i.e., fast). Also, as the recording density has increased, the amount of (servo) data recorded per unit area in the servo pattern regions and the data recording regions has also become extremely large.

This means that in a modern recording/reproducing apparatus, due to the large number of convex magnetic portions and non-magnetic portions that pass below the magnetic head per unit time, it is necessary to extract the servo data from the reproducing signal and to carry out tracking servo control based on the extracted servo data at high speed.

However, in a conventional disk drive, since it is necessary to carry out a polarity reversing process on the reproducing signal when reading a magnetic signal from any of the one surface and the other surface of the magnetic disk, the time required by such polarity reversing process makes it difficult to extract the servo data at high speed. Accordingly, in a conventional hard disk drive, since it is difficult to carry out tracking servo control at high speed, there is the problem that it is difficult to record and reproduce data at high speed.

Here, by separately providing servo control data for the one surface of the magnetic disk and servo control data for the other surface of the magnetic disk or by separately providing a servo control circuit for the one surface and a servo control circuit for the other surface, it is possible to extract servo data from both the one surface and the other surface without carrying out a polarity reversing process on the reproducing signal. However, if two sets of conflicting servo control data or servo control circuits are separately provided, due to the cost required to program the servo control data (i.e., control programs) and/or the cost required to implement two servo control circuits, there is the problem of an increased manufacturing cost for the disk drive.

If, during the manufacturing of the magnetic disk, the one surface and the other surface were separately DC magnetized using a magnetic head, for example, to set the magnetization directions of the convex magnetic portions on the one surface and the magnetization directions of the convex magnetic portions on the other surface differently (as one example, DC magnetizing of the convex magnetic portions on both the one surface and the other surface in respective directions toward the inside of the magnetic disk in the thickness direction), it would be possible to extract the servo data from the reproducing signal using a single set of servo control data and a single servo control circuit without carrying out a polarity reversing process on the reproducing signal. However, when this method of manufacturing is used, there is the problem of an increased manufacturing cost for the magnetic disk due to the increase in the time required by the magnetization process.

The present invention was conceived in view of the problems described above and it is a principal object of the present invention to provide a magnetic recording medium capable of high-speed recording and reproducing of data without leading to a high manufacturing cost, a recording/reproducing apparatus equipped with such magnetic recording medium, and a stamper capable of manufacturing such magnetic recording medium.

On a rotary-type magnetic recording medium according to the present invention, servo patterns are formed in servo pattern regions on one surface and another surface of a disk-shaped substrate by patterns including recording regions and non-recording regions, wherein in the servo pattern regions on both the one surface and the other surface, plural functional regions are defined in order in a direction of rotation of the magnetic recording medium, and in the pattern formed in at least one region out of the plural functional regions on the one surface, the non-recording regions are formed at formation positions on the one surface corresponding to formation positions of the recording regions on the other surface and the recording regions are formed at formation positions on the one surface corresponding to formation positions of the non-recording regions on the other surface.

The expression "recording regions" in the present specification refers to regions that are constructed so as to hold a recorded magnetic signal in a readable manner (that is, regions constructed so as to have the ability to hold a magnetic signal in a readable manner). Similarly, the expression "non-recording regions" in the present specification refers to regions that are constructed so that an ability thereof to hold a recorded magnetic signal in a readable manner is lower than that of the recording regions, or regions constructed so as not to effectively have such ability. More specifically, the expression "non-recording regions" in the present specification refers to regions that emit a smaller magnetic field than that of the recording regions described above in a state where a magnetic signal has been recorded, or regions that effectively do not emit a magnetic field.

Also, the expression "formation positions on the one surface corresponding to formation positions of recording regions (or non-recording regions) on the other surface" refers to positions at which recording regions or non-recording regions on the one surface that functionally correspond to recording regions (or non-recording regions) on the other surface should be formed, and includes not only positions where the recording regions (or non-recording regions) on the respective surfaces are formed at opposing positions in the thickness direction of the substrate on the one surface and the other surface but also positions that are not opposing. Accordingly, when recording regions and non-recording regions are formed by forming a concave/convex pattern on each surface by imprinting or lithography, for example, in a state where there are no displacements in the circumferential direction (i.e., the direction of rotation of the magnetic recording medium) or the radial direction of each stamper pressed onto the surfaces or no displacement in the circumferential direction or the radial direction of the drawing position of patterns, the positions at which the recording regions or non-recording regions should be formed on the one surface will be opposite the formation positions of corresponding recording regions (or non-recording regions) on the other surface in the thickness direction of the substrate. However, when such displacements occur, the positions at which the recording regions or non-recording regions should be formed on the one surface will not be opposite the formation positions of the corresponding recording regions (or non-recording regions) on the other surface in the thickness direction of the substrate.

A recording/reproducing apparatus according to the present invention includes: the magnetic recording medium described above; a magnetic head that carries out a read of a magnetic signal from the magnetic recording medium and a write of a magnetic signal onto the magnetic recording medium; and a control unit that extracts servo data based on the magnetic signal read from the servo pattern regions of the magnetic recording medium and carries out tracking servo control of the magnetic head based on the extracted servo data.

According to the magnetic recording medium and recording/reproducing apparatus described above, the formation positions of the convex magnetic portions (recording regions) and non-magnetic portions (non-recording regions) match on the one surface and the other surface of the magnetic disk, and by DC magnetizing the entire magnetic disk (i.e., both surfaces) in a single operation, unlike the conventional disk drive where a polarity reversing process needs to be carried out on the reproducing signal when reading a servo pattern from a servo pattern region, it is possible to extract servo data from both the one surface and the other surface without carrying out a polarity reversing process on the reproducing signal, even when the entire magnetic recording medium has been DC magnetized in a single operation. Accordingly, it is possible to carry out recording and reproducing at high speed on both the one surface and the other surface of the magnetic recording medium.

Also, on the magnetic recording medium, the functional regions where the pattern is formed corresponding to encoded servo data may be set as the at least one region and in the pattern formed in the functional regions where the pattern is formed corresponding to encoded servo data on the one surface, the non-recording regions may be formed at formation positions on the one surface corresponding to formation positions of the recording regions that construct the servo data on the other surface and the recording regions may be formed at formation positions on the one surface corresponding to formation positions of the non-recording regions that construct the servo data on the other surface.

Note that on the one surface and the other surface of the substrate, when the number of recording regions that construct the servo data described above and the number of non-recording regions that construct the servo data are not equal, the formation positions of the recording regions and non-recording regions may be reversed in at least the region with the lower number of magnetic and non-magnetic regions. The expression "formation positions are reversed" in the present specification refers to a state where the non-recording regions are formed at formation positions on the other surface (or the one surface) corresponding to formation positions of the recording regions on the one surface (or the other surface) and the recording regions are formed at formation positions on the other surface (or the one surface) corresponding to formation positions of the non-recording regions on the one surface (or the other surface).

In the recording/reproducing apparatus according to the present invention, the control unit may extract the servo data by carrying out one of a subtraction process and a differential process on an output signal outputted from the magnetic head when the magnetic signal is read from the functional region where the pattern is formed corresponding to encoded servo data.

According to this magnetic recording medium and this recording/reproducing apparatus, it is possible to extract servo data from the one surface and the other surface of the magnetic disk using a single set of servo control data and a single servo control circuit without providing servo control data (or a control program) and a servo control circuit separately for each of the one surface and the other surface of the magnetic disk or carrying out a separate magnetization process on each of the one surface and the other surface of the magnetic disk. By doing so, it is possible to sufficiently reduce the manufacturing cost of a recording/reproducing apparatus.

Also, on the magnetic recording medium according to the present invention, in the pattern formed in each burst pattern region out of the plural functional regions on the one surface, the recording regions may be formed at formation positions on the one surface corresponding to formation positions of the recording regions on the other surface and the non-recording regions may be formed at formation positions on the one surface corresponding to formation positions of the non-recording regions on the other surface.

According to this magnetic recording medium, in the burst pattern regions where there is a great difference in the ratio of the area of the recording regions to the area of the non-recording regions, it is possible to set the ratio equal on both surfaces of the magnetic recording medium so that the processing conditions during manufacturing can be set equal for both surfaces of the magnetic recording medium. More specifically, during a process that forms resin masks using stampers for manufacturing the magnetic recording medium by imprinting, for example, since it is possible to carry out imprinting according to the same imprinting conditions on both the one surface and the other surface of the body on which the masks are being formed, it is possible to form resin masks with concaves of the same depth (or convexes of the same height) on both the one surface and the other surface. Since it is possible to use the same etching conditions on both surfaces of the magnetic recording medium when forming patterns in magnetic layers by etching, it is easy to etch both surfaces simultaneously, for example.

A pair of stampers for manufacturing the magnetic recording medium according to the present invention are composed of: a first stamper on which is formed a concave/convex pattern with concaves formed corresponding to the recording regions in the pattern on the one surface of the magnetic recording medium and convexes formed corresponding to the non-recording regions in the pattern on the one surface; and a second stamper on which is formed a concave/convex pattern with concaves formed corresponding to the recording regions in the pattern on the other surface of the magnetic recording medium and convexes formed corresponding to the non-recording regions in the pattern on the other surface.

According to these stampers for manufacturing a magnetic recording medium, it is possible to easily manufacture, by imprinting or the like, a magnetic recording medium where servo data can be extracted (without carrying out a polarity reversing process on a reproducing signal) from one surface and another surface, even when the entire magnetic recording medium has been DC magnetized in a single operation.

It should be noted that the disclosure of the present invention relates to a content of Japanese Patent Application 2007-005252 that was filed on 13 Jan. 2007 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a magnetic recording medium, a recording/reproducing apparatus, and a stamper for manufacturing a magnetic recording medium according to the present invention will now be described with reference to the attached drawings.

First, the construction of a recording/reproducing apparatus according to the present invention will be described with reference to the drawings.

Figure 1:
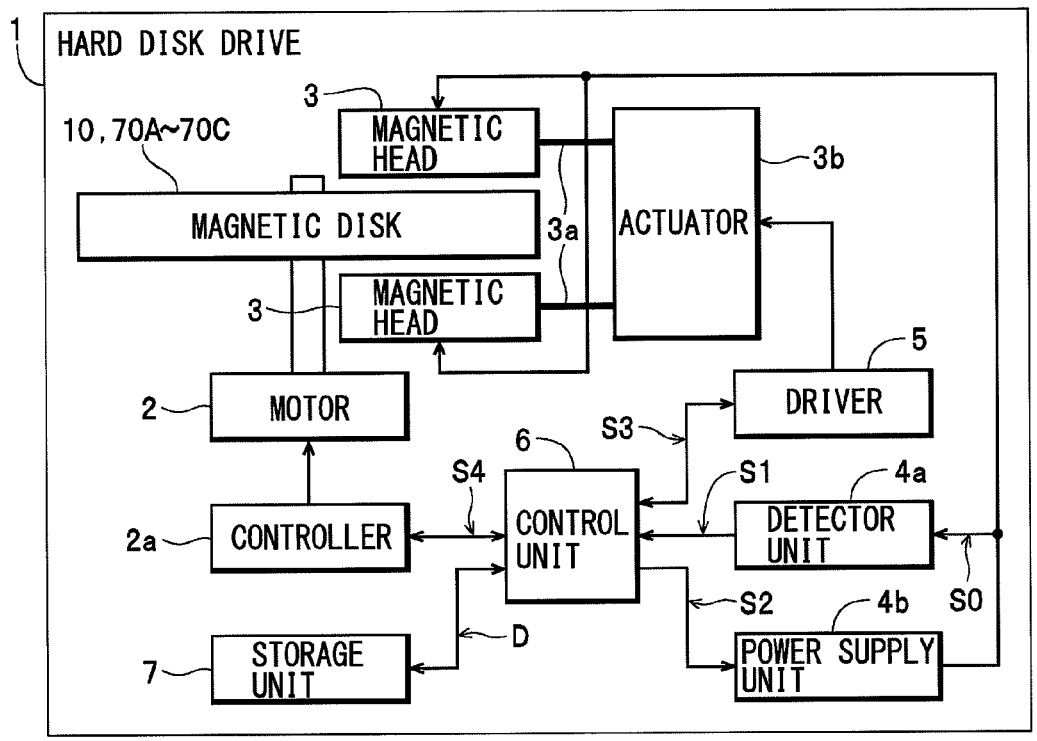
FIG. 1 is a schematic diagram showing the construction of a hard disk drive.
Figure 2:
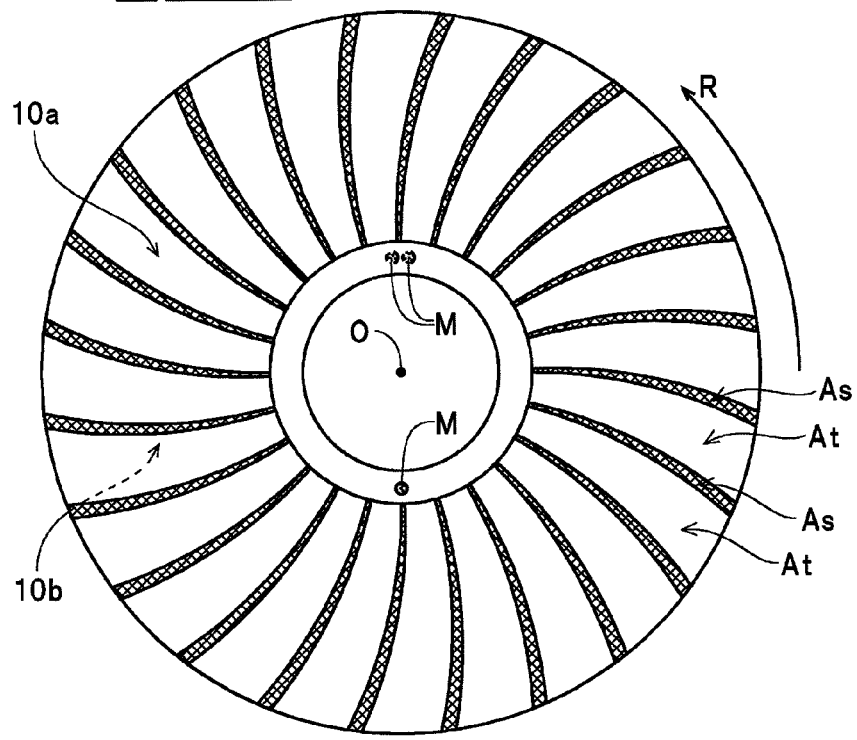
FIG. 2 is a plan view of a magnetic disk according to embodiments of the present invention when viewed from a first surface side thereof.
Figure 3:
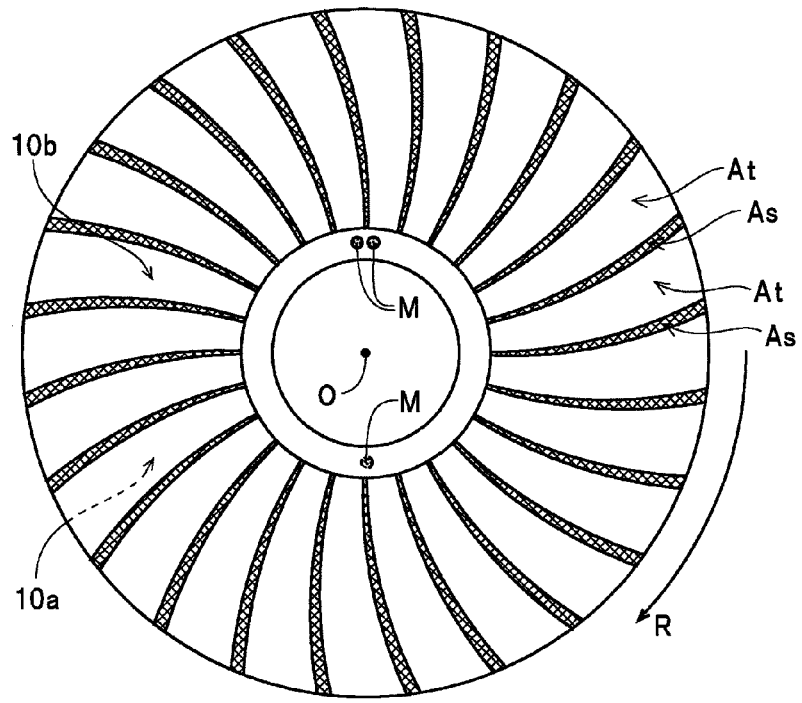
FIG. 3 is a plan view of a magnetic disk according to the embodiments when viewed from a second surface side thereof.

A hard disk drive 1 shown in FIG. 1 is one example of a recording/reproducing apparatus according to the present invention, includes a motor 2, a controller 2a, a pair of magnetic heads 3, a detector unit 4a, a power supply unit 4b, a driver 5, a control unit 6, a storage unit 7, and a magnetic disk 10, and is constructed so as to be capable of recording and reproducing various types of data. Note that although the hard disk drive 1 is actually equipped with plural magnetic disks 10 and has a pair of magnetic heads 3 provided for each magnetic disk 10, for ease of understanding the present invention, a drive equipped with a single magnetic disk 10 and a pair of magnetic heads 3 for carrying out recording and reproducing of data on the magnetic disk 10 will be described below. Here, the magnetic disk 10 is a discrete track medium (one example of a patterned medium) for double-sided recording as one example of a magnetic recording medium according to the present invention. As shown in FIGS. 2 and 3, the magnetic disk 10 is formed in an overall disk shape and is attached to a rotational shaft of the motor 2. On the other hand, the motor 2 rotates the magnetic disk 10 at a constant velocity, for example 4200 rpm, in accordance with control by the control unit 6. A controller 2a rotates the motor 2 in accordance with a control signal S4 outputted from the control unit 6.

Out of the magnetic heads 3, one magnetic head 3 is disposed facing a first surface 10a of the magnetic disk 10 and is attached to an actuator 3b via a swing arm 3a and the other magnetic head 3 is disposed facing a second surface 10b of the magnetic disk 10 and is attached to the actuator 3b via a swing arm 3a. Here, both magnetic heads 3 are moved over the magnetic disk 10 by rotating the swing arms 3a using the actuator 3b during the recording and reproducing of data on the magnetic disk 10. The magnetic heads 3 carry out reads of servo signals from servo pattern regions As (see FIGS. 2, 3, and 5) of the magnetic disk 10, magnetic writes of data in data recording regions At (see FIGS. 2, 3, and 5), and reads of data that has been magnetically written in the data recording regions At. Note that although the magnetic heads 3 are each actually constructed by forming a recording element and a reproducing element on the base surface (i.e., air bearing surface) of a slider for causing the magnetic head 3 to fly above the magnetic disk 10, the sliders, the recording elements, and the reproducing elements are omitted from the description and drawings. According to a driving current supplied from the driver 5 under the control of the control unit 6, the actuator 3b swings the swing arms 3a to move the magnetic heads 3 to a freely chosen recording/reproducing position on the magnetic disk 10.

Together with the control unit 6, the detector unit 4a constructs a "control unit" for the present invention, carries out a subtraction process on an output signal S0 (analog signal: servo signal) outputted from the magnetic head 3 to extract servo data and thereby generate a detection signal S1, and outputs the generated detection signal S1 to the control unit 6. During the recording of data on the magnetic disk 10, the power supply unit 4b supplies an AC voltage whose potential is reversed at predetermined periods to the magnetic head 3 in accordance with a control signal S2 outputted from the control unit 6. The driver 5 controls the actuator 3b in accordance with a control signal S3 outputted from the control unit 6 to make a magnetic head 3 on-track to a desired data recording track. The control unit 6 carries out overall control over the hard disk drive 1. Also, based on the detection signal (servo data) S1 outputted from the detector unit 4a and servo control data D stored in the storage unit 7, the control unit 6 controls the controller 2a, the power supply unit 4b, and the driver 5 (i.e., the control unit 6 carries out a tracking servo control process and a recording/reproducing process for data). The storage unit 7 stores the servo control data D mentioned above and the like.

Figure 4:
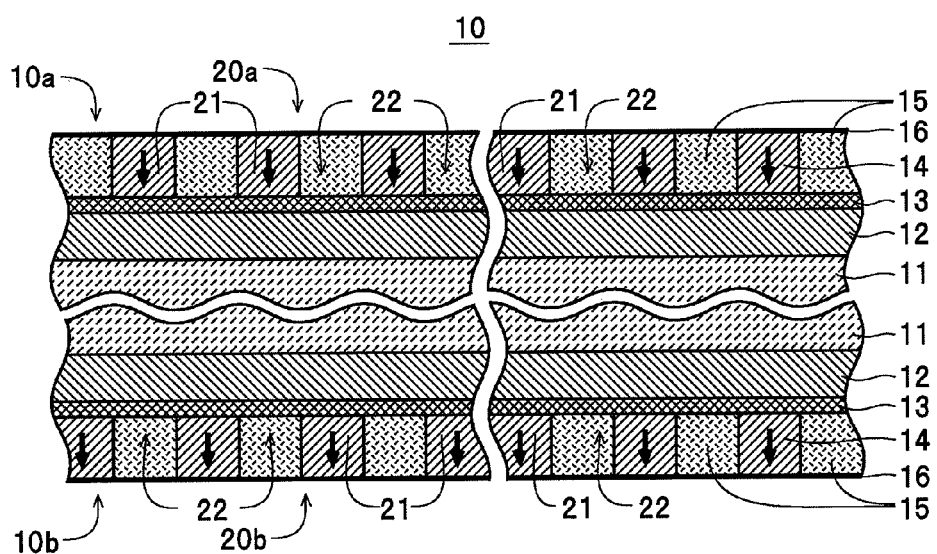
FIG. 4 is a cross-sectional view of a magnetic disk.

The magnetic disk 10 is installed inside the case of the hard disk drive 1 together with the motor 2, the magnetic head 3, and the like. As shown in FIG. 4, the magnetic disk 10 is constructed by forming a soft magnetic layer 12, an intermediate layer 13, and a magnetic layer 14 in the mentioned order on the first surface 10a (the "one surface" for the present invention) and the second surface 10b (the "other surface" for the present invention) of a glass base plate 11. As one example, data can be recorded on the magnetic disk 10 using a perpendicular recording method. Here, as shown in FIGS. 2 and 3, the magnetic disk 10 is constructed with one identification mark M formed in the center on the first surface 10a and two identification marks M formed in the center on the second surface 10b so that the first surface 10a and the second surface 10b can be distinguished by the number of identification marks M. Also, as shown in FIG. 4, the respective magnetic layers 14 are composed of plural convexes 21 whose protruding end parts (the upper end parts in FIG. 4) for example are formed of magnetic material and concaves 22 disposed between adjacent convexes 21 to construct a concave/convex pattern 20a on the first surface 10a and a concave/convex pattern 20b on the second surface 10b. Also, a non-magnetic material 15 such as $SiO_2$, C (carbon) or resin material is filled inside the concaves 22 in the concave/convex patterns 20a, 20b to smooth the surfaces of the magnetic disk 10.

In this case, on the magnetic disk 10, the formation regions of the convexes 21 correspond to "recording regions" for the present invention and the formation regions of the concaves 22 correspond to "non-recording regions" for the present invention. In addition, on the magnetic disk 10, a protective layer 16 (a DLC film) with a thickness of around 4 nm is formed of diamond-like carbon (DLC) or the like on the surfaces of the non-magnetic material 15 filled in the concaves 22 (i.e., filled between the adjacent convexes 21) and on the surface of each magnetic layer 14 (the convexes 21). A lubricant (as one example, a Fomblin lubricant) is also applied onto the surfaces of the protective layers 16 to prevent damage to both the magnetic heads 3 and the magnetic disk 10.

The glass base plate 11 corresponds to a "substrate" for the present invention and is formed in a disk-like shape with a thickness of around 0.6 mm by polishing the surface of a glass plate. Note that the "substrate" for the present invention is not limited to a glass base plate and it is possible to use a substrate formed in a disk-like shape using various types of non-magnetic material such as aluminum and ceramics. On each surface, the soft magnetic layer 12 is formed into a thin film with a thickness of around 50 nm to 200 nm, inclusive by sputtering a soft magnetic material such as CoZrNb alloy. The intermediate layer 13 functions as an underlayer for forming the magnetic layer 14 and is formed into a thin film with a thickness of around 40 nm by sputtering an intermediate layer forming material such as Ru, Cr or a non-magnetic CoCr alloy. As described earlier, the magnetic layer 14 is a layer that constructs the concave/convex patterns 20a, 20b (the data track patterns 20t and the servo patterns 20s shown in FIG. 5) and the concaves 22 are formed by etching a layer produced by sputtering CoCrPt alloy, for example.

As shown in FIGS. 2 and 3, on both the first surface 10a and the second surface 10b of the magnetic disk 10, the servo pattern regions As are provided between the data recording regions At and are defined so that the data recording regions At and the servo pattern regions As are alternately disposed in the direction of rotation of the magnetic disk 10 (i.e., the direction of the arrow R). Note that in the present specification, each region sandwiched by two data recording regions At aligned in the direction of rotation (i.e., each region from a trailing end in the direction of rotation of a data recording region At to a leading end in the direction of rotation of the next data recording region At) is regarded as a servo pattern region As. Also, the ends in the direction of rotation of the data recording regions At are set as coinciding with virtual segments (linear or arc-shaped segments along the radial direction of the magnetic disk 10) that join the respective ends in the direction of rotation of plural data recording tracks (the convexes 21) formed in the data recording regions At.

The hard disk drive 1 equipped with the magnetic disk 10 is constructed so that the magnetic disk 10 is rotated at a fixed angular velocity by the motor 2 in accordance with control by the control unit 6 as described earlier. Accordingly, as shown in FIGS. 2 and 3, on the magnetic disk 10, the length of each data recording region At along the direction of rotation of the magnetic disk 10 and the length of each servo pattern region As along the direction of rotation are set so as to increase as the distance from the center O of the data track patterns 20t increases (i.e., the data recording regions At and the servo pattern regions As are set so as to widen from an inner periphery region toward an outer periphery region) in proportion to the length of a part of the magnetic disk 10 that passes below the magnetic head 3 per unit time. As a result, the length along the direction of rotation of the protruding end surfaces of the data recording tracks (the convexes 21) formed inside the data recording regions At, the standard length along the direction of rotation of the protruding end surfaces of the convexes 21 used in the servo patterns 20s formed inside the servo pattern regions As, and the standard gap length (i.e., the length of a gap between facing ends of the protruding end surfaces of two adjacent convexes 21: for example a length corresponding to the unitary signal length) along the direction of rotation of the concaves 22 used in the servo patterns 20s are set so as to increase from the inner periphery region toward the outer periphery region of the magnetic disk 10.

Figure 5:
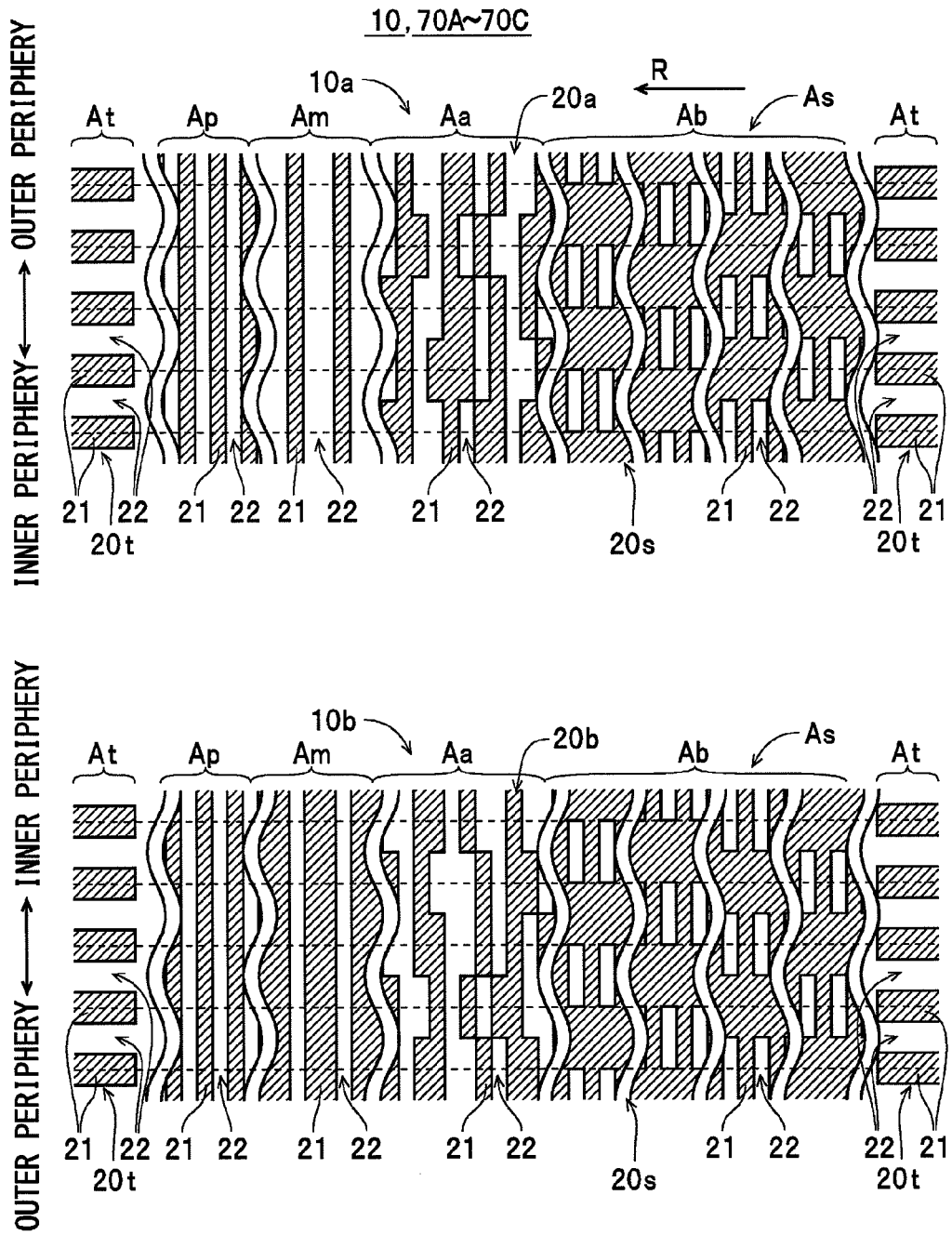
FIG. 5 is a plan view of data recording regions and a servo pattern region on the magnetic disk according to the embodiments.

Also, as shown in FIG. 5, a data track pattern 20t is formed in each data recording region At. Note that the obliquely shaded regions in FIG. 5 and in FIGS. 6 to 8 and FIGS. 12 to 17 described later show formation positions of the convexes 21 ("recording regions" for the present invention) in the concave/convex patterns 20a, 20b. In this example, the data track patterns 20t inside the data recording regions At are composed of plural convexes 21 (long belt-shaped convexes 21 that are continuously formed and elongated along the direction of rotation of the magnetic disk 10) that construct a large number of data recording tracks that are concentric (or spiral) about the center O (see FIGS. 2 and 3) and are disposed a predetermined pitch apart, and plural concaves 22 (the concaves 22 between the convexes 21 or "inter-track concaves") that construct guard band parts. As one example, the convexes 21 and the concaves 22 inside the data recording regions At are set on both the first surface 10a and the second surface 10b so that the respective lengths thereof along the radial direction are substantially equal and are formed so that the formation pitch of the convexes 21 (that is, the track pitch of the data recording tracks) and the length of the convexes 21 in the radial direction of the magnetic disk 10 (that is, the lengths in the radial direction of the data recording tracks and the guard band parts) are substantially equal across the entire range from the inner periphery of the magnetic disk 10 to the outer periphery on both the first surface 10a and the second surface 10b.

Here, on the magnetic disk 10, in the data track patterns 20t (i.e., the concave/convex pattern 20a) formed in the data recording regions At on the first surface 10a, the convexes 21 are formed at formation positions on the first surface 10a corresponding to formation positions of convexes 21 in the data track patterns 20t (the concave/convex pattern 20b) inside the data recording regions At on the second surface 10b, and the concaves 22 are formed at formation positions on the first surface 10a corresponding to formation positions of concaves 22 in the data track patterns 20t (the concave/convex pattern 20b) inside the data recording regions At on the second surface 10b. That is, on the magnetic disk 10, the formation positions of the convexes 21 and the concaves 22 inside the data recording regions At are matching on the first surface 10a and the second surface 10b. Note that although it is preferable for the center of rotation of the magnetic disk 10 and the center O of the data track patterns 20t to match on both the first surface 10a and the second surface 10b, there is the risk of a minute displacement of 30 μm to 50 μm being caused between the center of rotation of the magnetic disk 10 and the center O of the data track patterns 20t due to manufacturing errors for the first surface 10a and the second surface 10b. However, since tracking servo control can still be performed sufficiently for the magnetic heads 3 when displacements of such magnitude are present, the center of rotation and the center O can be thought of as effectively matching.

On the other hand, in each servo pattern region As, plural regions that correspond to "functional regions" for the present invention are aligned in the direction of rotation, and concave/convex patterns 20a, 20b (the servo patterns 20s) with plural convexes 21 and plural concaves 22 that construct various servo patterns for tracking servo control are formed inside such functional regions. More specifically, as shown in FIG. 5, a preamble pattern region Ap in which a preamble pattern is formed by the servo pattern 20s, a servo address mark region Am in which servo address marks (i.e., a servo address mark pattern) are formed by the servo pattern 20s, an address pattern region Aa in which an address pattern is formed by the servo pattern 20s, and a burst pattern region Ab in which burst patterns are formed by the servo pattern 20s (examples of the "functional regions" for the present invention) are defined in the mentioned order in the direction of rotation inside each servo pattern region As. Four burst regions corresponding to signal regions for such burst patterns are defined inside the burst pattern region Ab. Note that although in reality, the concave/convex patterns 20a, 20b (the servo patterns 20s) are formed by defining regions with various other functions such as terminal pattern regions and parity pattern regions, for ease of understanding the present invention, such regions have been omitted from the description and drawings.

The preamble pattern region Ap is one example of a "region where a pattern is formed corresponding to encoded servo data" for the present invention, and in each preamble pattern region Ap, plural belt-shaped convexes 21 that elongated in the radial direction (the up-down direction in FIG. 5) of the magnetic disk 10 are formed along the direction of rotation (the direction of the arrow R) of the magnetic disk 10 with concaves 22 in between. More specifically, the preamble pattern formed in each preamble pattern region Ap is a servo pattern for correcting a base clock, which is used when reading various types of control signal from the address pattern region Aa, the burst pattern region Ab, and the like, in accordance with the rotational state (rotational velocity) of the magnetic disk 10. As one example, the length along the direction of rotation of the convexes 21 and the concaves 22 is set at a length corresponding to "1" or "0" in the servo data (i.e., the length corresponding to one bit).

Here, the length along the direction of rotation of the convexes 21 and the length along the direction of rotation of the concaves 22 formed in the preamble pattern region Ap are set so as to be equal at positions with the same radius (i.e., where the distance from the center O is equal) and so as to increase from an inner periphery region of the magnetic disk 10 toward the outer periphery region of the magnetic disk 10. Also, on the magnetic disk 10, in the servo patterns 20s (the concave/convex pattern 20a) formed in the preamble pattern regions Ap on the first surface 10a, the concaves 22 are formed at formation positions on the first surface 10a corresponding to formation positions of the convexes 21 of the servo patterns 20s (the concave/convex pattern 20b) inside the preamble pattern regions Ap on the second surface 10b and the convexes 21 are formed at formation positions on the first surface 10a corresponding to formation positions of the concaves 22 of the servo patterns 20s (the concave/convex pattern 20b) inside the preamble pattern regions Ap on the second surface 10b. That is, on the magnetic disk 10, the formation positions of the convexes 21 and the concaves 22 inside the preamble pattern regions Ap are reversed on the first surface 10a and the second surface 10b.

Figure 6:
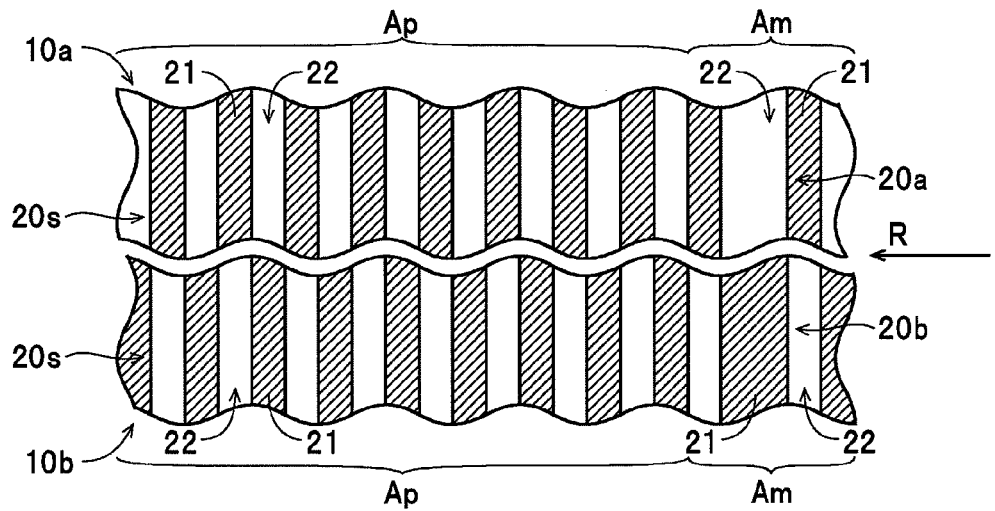
FIG. 6 is a plan view of one example of a servo pattern in a preamble pattern region within a servo pattern region.

Note that as shown in FIG. 6, the servo patterns 20s are formed so that around thirty convexes 21 and around thirty concaves 22 are aligned in the direction of rotation in each preamble pattern region Ap. As described later, to enable tracking servo control to be carried out on both the first surface 10a and the second surface 10b based on the same servo control data D, the formation positions may be reversed for at least five convexes 21 and at least five concaves 22 at the servo address mark region Am end of the preamble pattern region Ap in the direction of rotation of the magnetic disk 10. Note that in FIG. 6, an example is shown where the number of convexes 21 in the preamble pattern region Ap on the first surface 10a and the number of concaves 22 in the preamble pattern region Ap on the second surface 10b are equal and the number of concaves 22 in the preamble pattern region Ap on the first surface 10a and the number of convexes 21 in the preamble pattern region Ap on the second surface 10b are equal. Accordingly, in this example, the length along the direction of rotation (the direction of the arrow R) of the preamble pattern region Ap on the first surface 10a and the length along the direction of rotation (the direction of the arrow R) of the preamble pattern region Ap on the second surface 10b are equal.

Figure 7:
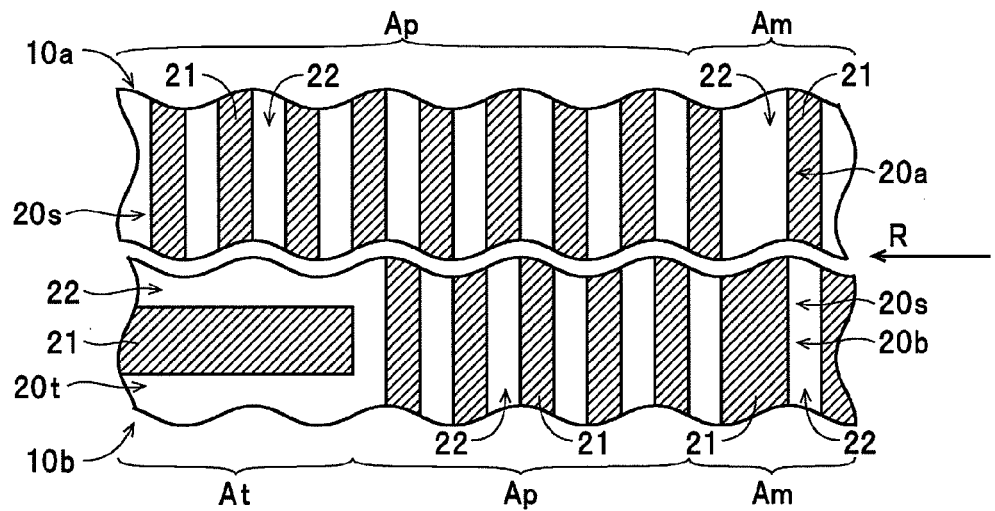
FIG. 7 is a plan view of another example of a servo pattern in a preamble pattern region within a servo pattern region.

On the other hand, the magnetic recording medium according to the present invention also includes media where the number of recording regions that construct the servo data and the number of non-recording regions that construct the servo data are not equal on one surface and another surface of a substrate. More specifically, in the concave/convex patterns 20a, 20b shown in FIG. 7, as one example, the servo pattern 20s is formed inside the preamble pattern region Ap on the first surface 10a so that around thirty convexes 21 and around thirty concaves 22 are aligned in the direction of rotation and the servo pattern 20s is formed inside the preamble pattern region Ap on the second surface 10b so that five convexes 21 and five concaves 22 are aligned in the direction of rotation. In this state also, if convexes 21 are formed at formation positions on the first surface 10a corresponding to formation positions of concaves 22 in the preamble pattern region Ap on the second surface 10b and concaves 22 are formed at formation positions on the first surface 10a corresponding to formation positions of convexes 21 in the preamble pattern region Ap on the second surface 10b (that is, if the formation positions of at least five convexes 21 and at least five concaves 22 that construct a preamble pattern are reversed), in the same way as the construction shown in FIG. 6, it will be possible to read (extract) preamble patterns from both the first surface 10a and the second surface 10b. Note that although FIG. 7 shows a state where a data track pattern 20t is formed on the upstream side in the direction of rotation of the second surface 10b (the left side in FIG. 7), the same effect is achieved even when neither a data track pattern 20t nor a servo pattern 20s is formed at this position (i.e., a state where one large concave 22 or convex 21 is formed).

Figure 8:
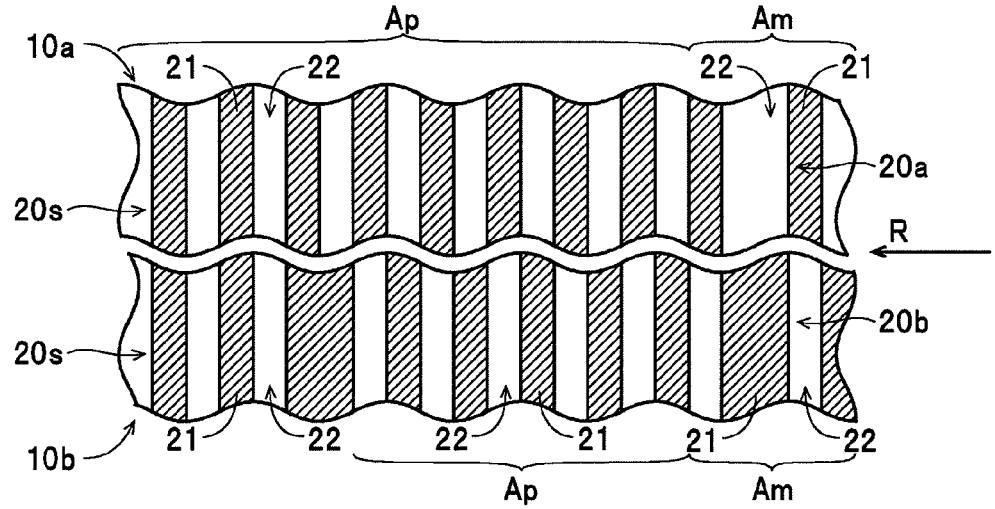
FIG. 8 is a plan view of yet another example of a servo pattern in a preamble pattern region within a servo pattern region.

In the concave/convex patterns 20a, 20b shown in FIG. 8, as another example, inside each preamble pattern region Ap on the first surface 10a, the servo pattern 20s is formed so that around thirty convexes 21 and around thirty concaves 22 are aligned, and inside each preamble pattern region Ap on the second surface 10b, the servo pattern 20s is formed so that five convexes 21 and five concaves 22, for example, that serve as a preamble pattern are aligned and twenty-five convexes 21 and twenty-five concaves 22, for example, that do not serve as a preamble pattern are aligned. In this state also, if convexes 21 are formed at formation positions on the first surface 10a corresponding to formation positions of concaves 22 in the preamble pattern regions Ap on the second surface 10b and concaves 22 are formed at formation positions on the first surface 10a corresponding to formation positions of convexes 21 in the preamble pattern regions Ap on the second surface 10b (i.e., if the formation positions are reversed for at least five convexes 21 and at least five concaves 22 that construct each preamble pattern), in the same way as the constructions shown in FIGS. 6 and 7, it will be possible to read (i.e., extract) preamble patterns from both the first surface 10a and the second surface 10b. Note that as shown in FIG. 8, in the present specification, even though such convexes 21 and concaves 22 have the same form as a servo pattern (in this example, a preamble pattern), the region in which the convexes 21 and the concaves 22 that do not serve as a servo pattern are formed is not regarded as a "functional region" for the present invention (in this example, a preamble pattern region Ap).

The servo address marks formed in each servo address mark region Am are another example of a "region where a pattern is formed corresponding to encoded servo data" for the present invention, and plural belt-shaped convexes 21 elongated in the radial direction (i.e., the up-down direction in FIG. 5) of the magnetic disk 10 and plural belt-shaped concaves 22 elongated in the radial direction are aligned in the direction of rotation of the magnetic disk 10 (i.e., the direction of the arrow R). More specifically, the servo address marks are a servo pattern for specifying a read start position of an address pattern, and the length along the direction of rotation of the convexes 21 and the length along the direction of rotation of the concaves 22 that are formed in the servo address mark region Am are set so that at positions with the same radius (i.e., positions where the distance from the center O is equal), as one example, on the first surface 10a, the length of the concaves 22 is double the length of the convexes 21 and such lengths are greater in the outer periphery region of the magnetic disk 10 than in the inner periphery region of the magnetic disk 10, and on the second surface 10b, the length of the convexes 21 is double the length of the concaves 22 and such lengths are greater in the outer periphery region of the magnetic disk 10 than in the inner periphery region of the magnetic disk 10.

In addition, on the magnetic disk 10, in the servo pattern 20s (the concave/convex pattern 20a) formed in each servo address mark region Am on the first surface 10a, concaves 22 are formed at formation positions on the first surface 10a corresponding to formation positions of convexes 21 in the servo pattern 20s (the concave/convex pattern 20b) in each servo address mark region Am on the second surface 10b and convexes 21 are formed at formation positions on the first surface 10a corresponding to formation positions of concaves 22 in the servo pattern 20s (the concave/convex pattern 20b) in each servo address mark region Am on the second surface 10b. That is, on the magnetic disk 10, the formation positions of the convexes 21 and the concaves 22 in the servo address mark regions Am are reversed on the first surface 10a and the second surface 10b.

The address pattern region Aa is yet another example of a "region where a pattern is formed corresponding to encoded servo data" for the present invention and the address pattern formed in each address pattern region Aa corresponds to address data showing the track number of the track to which the magnetic head 3 is being made on-track and the sector number of the sector at which the magnetic head 3 is positioned. In an address pattern, the length of each convex 21 along the direction of rotation and the length of each concave 22 along the direction of rotation are set separately for the first surface 10a and the second surface 10b. Here, on the magnetic disk 10, in the servo pattern 20s (the concave/convex pattern 20a) formed in each address pattern region Aa on the first surface 10a, concaves 22 are formed at formation positions on the first surface 10a corresponding to formation positions of convexes 21 in the servo pattern 20s (the concave/convex pattern 20b) inside an address pattern region Aa on the second surface 10b, and convexes 21 are formed at formation positions on the first surface 10a corresponding to formation positions of concaves 22 in the servo pattern 20s (the concave/convex pattern 20b) inside the address pattern region Aa on the second surface 10b. That is, on the magnetic disk 10, the formation positions of the convexes 21 and the concaves 22 in the address pattern regions Aa are reversed on the first surface 10a and the second surface 10b.

The burst pattern region Ab is an example of a region that differs to a "region where a pattern is formed corresponding to encoded servo data" for the present invention. Burst patterns (i.e., servo patterns for position detection) for obtaining burst signals for correcting the position of a magnetic head 3 above the magnetic disk 10 are formed in each burst pattern region Ab. On the magnetic disk 10, the burst regions are constructed by forming plural concaves 22 that are rectangular in planar form therein.

On the magnetic disk 10, in the servo pattern 20s (the concave/convex pattern 20a) formed in each burst pattern region Ab on the first surface 10a, convexes 21 are formed at formation positions on the first surface 10a corresponding to formation positions of convexes 21 in the servo pattern 20s (the concave/convex pattern 20b) in a burst pattern region Ab on the second surface 10b, and concaves 22 are formed at formation positions on the first surface 10a corresponding to formation positions of concaves 22 in the servo pattern 20s (the concave/convex pattern 20b) in a burst pattern region Ab on the second surface 10b. That is, on the magnetic disk 10, the formation positions of the convexes 21 and the concaves 22 in the burst pattern region Ab match on the first surface 10a and the second surface 10b. Note that although in reality the convexes 21 and the concaves 22 are given skew angles in the servo pattern 20s described above in the inner periphery region and the outer periphery region of the magnetic disk 10, for ease of understanding the present invention, the skew angles have been omitted from the description and drawings.

Here on the magnetic disk 10, as described later, during manufacturing, by applying a magnetic field in a direction that passes through the magnetic disk 10 in the thickness direction thereof, for example, as shown by the arrows in FIG. 4, the convexes 21 on the entire first surface 10a and second surface 10b of the magnetic disk 10 are DC magnetized in the same direction (in this example, from the first surface 10a toward the second surface 10b in the thickness direction of the magnetic disk 10). Accordingly, on the magnetic disk 10, the magnetization direction of the convexes 21 on the first surface 10a when expressed relative to the position of a magnetic head 3 that is disposed on the first surface 10a side and the magnetization direction of the convexes 21 on the second surface 10b when expressed relative to the position of a magnetic head 3 that is disposed on the second surface 10b side are opposed.

Next, the method of manufacturing the magnetic disk 10 will be described.

Figure 10:
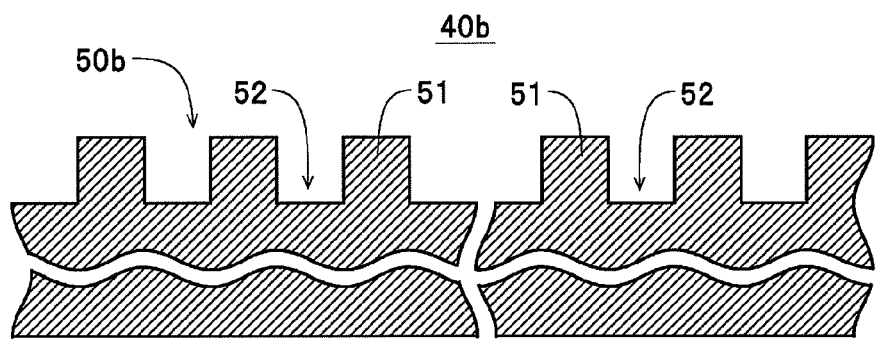
FIG. 10 is a cross-sectional view of another stamper.
Figure 11:
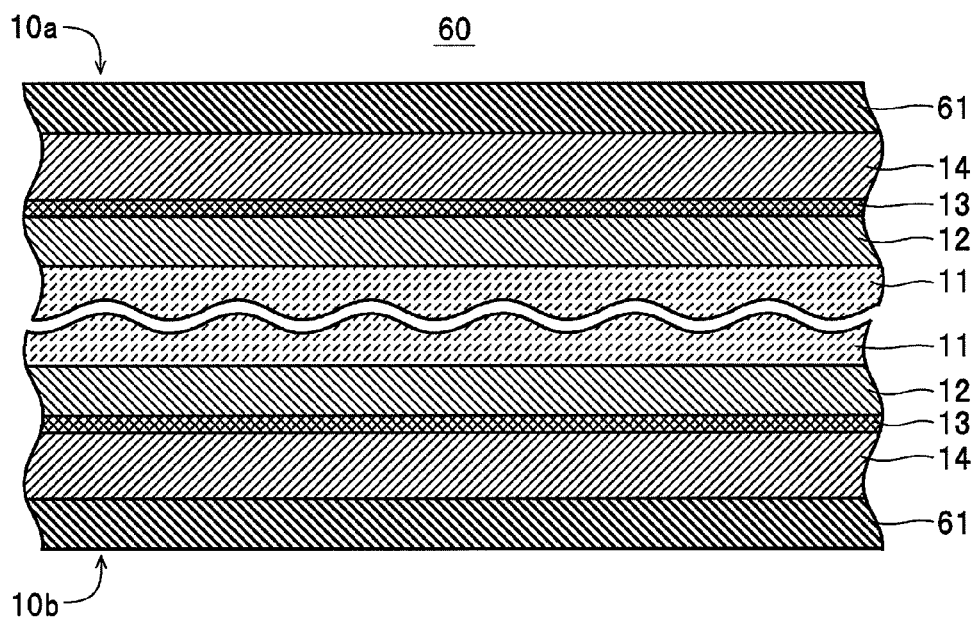
FIG. 11 is a cross-sectional view of a preform.

When manufacturing the magnetic disk 10 described above, stampers 40a, 40b shown in FIGS. 9, 10 and a preform 60 shown in FIG. 11 are used. Here, the preform 60 is produced by laminating the soft magnetic layer 12, the intermediate layer 13, and the magnetic layer 14 in the mentioned order on the first surface 10a and the second surface 10b of the glass base plate 11, and on both the first surface 10a and the second surface 10b, the magnetic layer 14 is covered by a metal mask layer 61. Also, during the manufacturing of the magnetic disk 10, both metal mask layers 61 of the preform 60 become covered by a resin mask layer (or "resist layer", not shown) with a thickness of around 80 nm which is used to transfer concave/convex patterns 50a, 50b of the stampers 40a, 40b (i.e., resin mask layers are formed on the metal mask layers 61).

Figure 9:
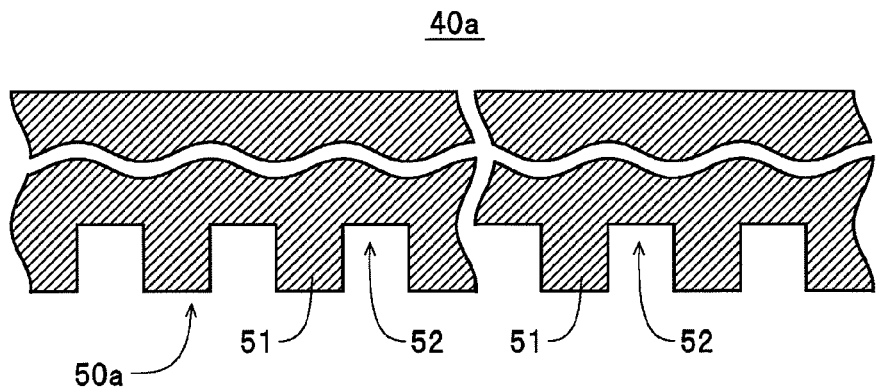
FIG. 9 is a cross-sectional view of a stamper.

On the other hand, the stampers 40a, 40b correspond to "a pair of stampers for manufacturing a magnetic recording medium" according to the present invention, and are constructed so as to be capable of manufacturing the magnetic disk 10 by imprinting. The stamper 40a is one example of a "first stamper" for the present invention, and the concave/convex pattern 50a for forming a mask pattern used to form the concave/convex pattern 20a on the first surface 10a side of the preform 60 (i.e., the data track patterns 20t and the servo patterns 20s on the first surface 10a) is formed thereupon. More specifically, as shown in FIG. 9, the concave/convex pattern 50a of the stamper 40a corresponds to the concave/convex pattern 20a to be formed on the first surface 10a of the magnetic disk 10 and therefore convexes 51 are formed corresponding to the concaves 22 of the concave/convex pattern 20a and concaves 52 are formed corresponding to the convexes 21 of the concave/convex pattern 20a.

Also, the stamper 40b is one example of a "second stamper" for the present invention, and the concave/convex pattern 50b for forming a mask pattern used to form the concave/convex pattern 20b on the second surface 10b of the preform 60 (i.e., the data track patterns 20t and the servo patterns 20s on the second surface 10b) is formed thereupon. More specifically, as shown in FIG. 10, the concave/convex pattern 50b of the stamper 40b corresponds to the concave/convex pattern 20b to be formed on the second surface 10b of the magnetic disk 10 and therefore convexes 51 are formed corresponding to the concaves 22 of the concave/convex pattern 20b and concaves 52 are formed corresponding to the convexes 21 of the concave/convex pattern 20b.

Accordingly, in each region of the stamper 40a corresponding to a servo pattern region As, convexes 51 in regions corresponding to a preamble pattern region Ap, a servo address mark region Am, and an address pattern region Aa are formed corresponding to formation positions of concaves 52 in regions of the stamper 40b corresponding to a preamble pattern region Ap, a servo address mark region Am, and an address pattern region Aa. Similarly, in each region of the stamper 40a corresponding to a servo pattern region As, concaves 52 in regions corresponding to a preamble pattern region Ap, a servo address mark region Am, and an address pattern region Aa are formed corresponding to formation positions of convexes 51 in regions of the stamper 40b that correspond to a preamble pattern region Ap, a servo address mark region Am, and an address pattern region Aa.

Also, in each region of the stamper 40a corresponding to a servo pattern region As, convexes 51 in regions corresponding to a burst pattern region Ab are formed at formation positions on the stamper 40a corresponding to formation positions of convexes 51 in regions of the stamper 40b that correspond to a burst pattern region Ab, and concaves 52 in regions corresponding to a burst pattern region Ab are formed at formation positions on the stamper 40a corresponding to formation positions of concaves 52 in regions of the stamper 40b that correspond to a burst pattern region Ab. Note that there are no particular limitations on the method of manufacturing the stampers 40a, 40b, and it is possible to manufacture the stampers 40a, 40b according to various well-known methods of manufacturing a stamper.

When manufacturing the magnetic disk 10 using the stampers 40a, 40b, first the concave/convex patterns 50a, 50b of the stampers 40a, 40b are transferred to both resin mask layers of the preform 60 by imprinting on both sides. More specifically, by pressing the surface of the stamper 40a on which the concave/convex pattern 50a is formed onto the resin mask layer on the first surface 10a side of the preform 60 and pressing the surface of the stamper 40b on which the concave/convex pattern 50b is formed onto the resin mask layer on the second surface 10b side of the preform 60, the convexes 51 of both concave/convex patterns 50a, 50b are pressed into both resin mask layers on the preform 60. When doing so, the resist (resin mask layer) at positions where the convexes 51 are pressed in moves inside the concaves 52 of the concave/convex patterns 50a, 50b.

Here, as described earlier, on the stampers 40a, 40b, the formation positions of the convexes 51 and the concaves 52 in the regions corresponding to the burst pattern regions Ab match. Accordingly, the ratio of the area of the convexes 51 to the area of the concaves 52 in the regions corresponding to the burst pattern regions Ab is the same on both the stampers 40a, 40b. On the other hand, the formation positions of the convexes 51 and the concaves 52 are reversed in the regions of the stampers 40a, 40b that correspond to the preamble pattern regions Ap. However, in the preamble pattern regions Ap on the magnetic disk 10, although the length along the direction of rotation of the convexes 21 that construct the preamble patterns and the length along the direction of rotation of the concaves 22 that construct the preamble patterns are equal at positions with the same radius and the formation positions of the convexes 21 and the concaves 22 are reversed on the first surface 10a and the second surface 10b, the number of convexes 21 and the number of concaves 22 are equal on both the first surface 10a and the second surface 10b. Accordingly, the ratio of the area of the convexes 51 to the area of the concaves 52 in regions corresponding to the preamble pattern regions Ap is equal on both the stampers 40a, 40b.

Also, on the stampers 40a, 40b, the formation positions of the convexes 51 and the concaves 52 are reversed in the regions corresponding to the servo address mark regions Am. However, in the servo address mark regions Am on the magnetic disk 10, the ratio of the length along the direction of rotation of the convexes 21 that construct the servo address marks to the length along the direction of rotation of the concaves 22 that construct the servo address marks is set so as to be 1:2 on the first surface 10a and 2:1 on the second surface 10b. This means that on the magnetic disk 10, the ratio of the area of the convexes 21 to the area of the concaves 22 does not greatly differ between the first surface 10a and the second surface 10b, which makes it possible to avoid a situation where the ratio of the area of the convexes 51 to the area of the concaves 52 in regions corresponding to the servo address mark regions Am greatly differs between the stampers 40a, 40b. In addition, in the address pattern regions Aa of the magnetic disk 10, the ratio of the area of the convexes 21 that construct the address patterns to the area of the concaves 22 that construct the address patterns is approximately equal for the first surface 10a and the second surface 10b. Accordingly, the ratio of the area of the convexes 51 to the area of the concaves 52 in regions corresponding to the address pattern regions Aa is approximately equal on both the stampers 40a, 40b.

In addition, on the magnetic disk 10 described above, the formation positions of the convexes 21 (data recording tracks) and the concaves 22 (guard band parts) in the data recording regions At are matching on the first surface 10a and the data recording regions At on the second surface 10b. Accordingly, the ratio of the area of the convexes 51 to the area of the concaves 52 in regions corresponding to the data recording regions At is equal on both the stampers 40a, 40b. This means that on the stampers 40a, 40b described above, the ratio of the area of the convexes 51 to the area of the concaves 52 is substantially equal in both regions corresponding to the servo pattern regions As and regions corresponding to the data recording regions At (i.e., on the entire stampers). Accordingly, by applying an equal pressing force onto the stampers 40a, 40b, it is possible to sufficiently press the convexes 51 of the stamper 40a and the convexes 51 of the stamper 40b to an approximately equal depth in both resin mask layers (one example where the "processing conditions are the same for both surfaces")

After the pressing operation, the stampers 40a, 40b are respectively separated from the preform 60 and by carrying out an oxygen plasma process to remove resin (or "residue": not shown) remaining on base surfaces of concaves on both the first surface 10a and the second surface 10b, concave/convex patterns (or "resin mask patterns": not shown) composed of the resin mask layers are formed on both metal mask layers 61 of the preform 60. When doing so, since the convexes 51 of the stampers 40a, 40b are pressed into both resin mask layers to approximately the same depth, the thickness of the residue produced on the first surface 10a and the thickness of the residue produced on the second surface 10b are substantially equal. Accordingly, by carrying out the oxygen plasma process with the same processing conditions on both the first surface 10a and the second surface 10b of the magnetic disk 10, it is possible to remove the residue on both metal mask layers 61 in the same processing time. By doing so, it is possible to avoid a situation where the length (width) of the concaves (i.e., the parts where the convexes 51 were pressed in) in the resin masks differs between the first surface 10a and the second surface 10b due to differences in processing time.

Next, by carrying out an etching process simultaneously, for example, on both the first surface 10a and the second surface 10b of the preform 60 using both resin mask patterns described above as masks, both metal mask layers 61 are etched to form concave/convex patterns (or "metal mask patterns": not shown) composed of the metal mask layers 61 on the magnetic layers 14. After this, by carrying out an etching process with both metal mask patterns as masks, the magnetic layers 14 on the first surface 10a and the second surface 10b are etched to form the concave/convex patterns 20a, 20b including the plural convexes 21 and the plural concaves 22 in the magnetic layers 14 of the preforms 60.

Here, the ratio of the area of the convexes 51 to the area of the concaves 52 is substantially equal on the stampers 40a, 40b described above. This means that the ratio of the area of the concaves to the area of the convexes in the concave/convex patterns is substantially equal in the resin mask layers that have been formed on the first surface 10a and the second surface 10b of the preform 60 using the stampers 40a, 40b. Accordingly, by carrying out etching with the same conditions on both the first surface 10a and the second surface 10b of the preform 60, the concave/convex patterns 20a, 20b are formed with concaves 22 of the same depth (or convexes 21 of the same height) in the respective magnetic layers 14 on both the first surface 10a and the second surface 10b (another example where the "processing conditions are the same for both surfaces"). By doing so, the data track patterns 20t and the servo patterns 20s (i.e., the concave/convex patterns 20a, 20b) are formed on the respective intermediate layers 13.

Next, by carrying out an etching process on both the first surface 10a and the second surface 10b to selectively remove the metal mask layers remaining on the convexes 21, the protruding end surfaces of the convexes 21 are exposed. Next, $SiO_2$ is sputtered as the non-magnetic material 15 on both the first surface 10a and the second surface 10b to cover the surfaces on which the concave/convex patterns 20a, 20b are formed with the non-magnetic material 15. After this, ion beam etching is carried out on the layers of the non-magnetic material 15 on the magnetic layers 14 (i.e., on the convexes 21 and on the concaves 22). When doing so, as one example, the ion beam etching continues until the protruding end surfaces of the convexes 21 are exposed from the non-magnetic material 15. By doing so, both the first surface 10a and the second surface 10b of the preform 60 are smoothed. Next, thin films of diamond-like carbon (DLC) are formed by CVD so as to cover both the first surface 10a and the second surface 10b of the preform 60. In this way, the protective layers 16 are formed on both the first surface 10a and the second surface 10b. After this, a Fomblin lubricant is applied to the surfaces of both protective layers 16 with an average thickness of around 2 nm, for example.

After this, a magnetization process that DC magnetizes the magnetic disk 10 on which the application of the lubricant has been completed is carried out. More specifically, using a magnetizing apparatus, not shown, a magnetic field is applied to the magnetic disk 10 so as to pass through the magnetic disk 10 in the thickness direction so that across the entire first surface 10a and second surface 10b of the magnetic disk 10, the convexes 21 are collectively DC magnetized in the same direction (in this example, from the first surface 10a toward the second surface 10b in the thickness direction of the magnetic disk 10). By doing so, it becomes possible to magnetically read a servo pattern from each servo pattern region As, thereby completing the magnetic disk 10 as shown in FIG. 4. After this, by installing the completed magnetic disk 10 inside a case together with the magnetic heads 3 and the like, the hard disk drive 1 is completed.

Next, the operating principles of the hard disk drive 1 will be described with reference to the drawings.

Figure 12:
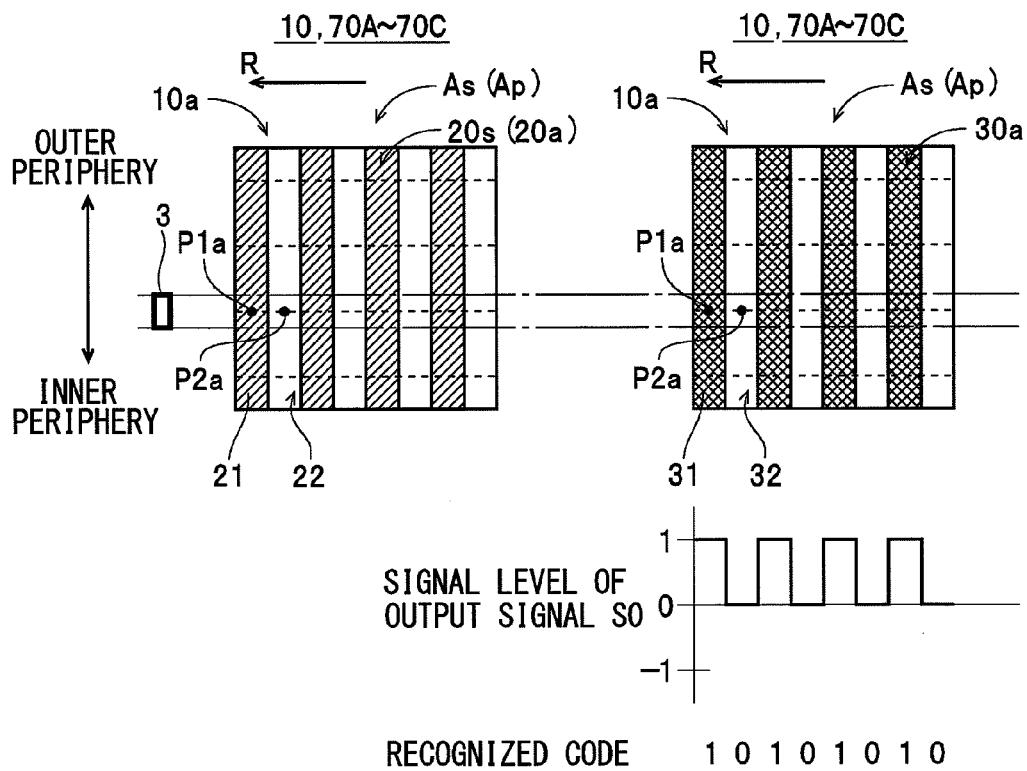
FIG. 12 is a diagram useful in explaining the relationship between (i) a servo pattern (concave/convex pattern) and magnetic pattern in a preamble pattern region on the first surface of a magnetic disk and (ii) a signal level of an output signal and recognized codes.
Figure 13:
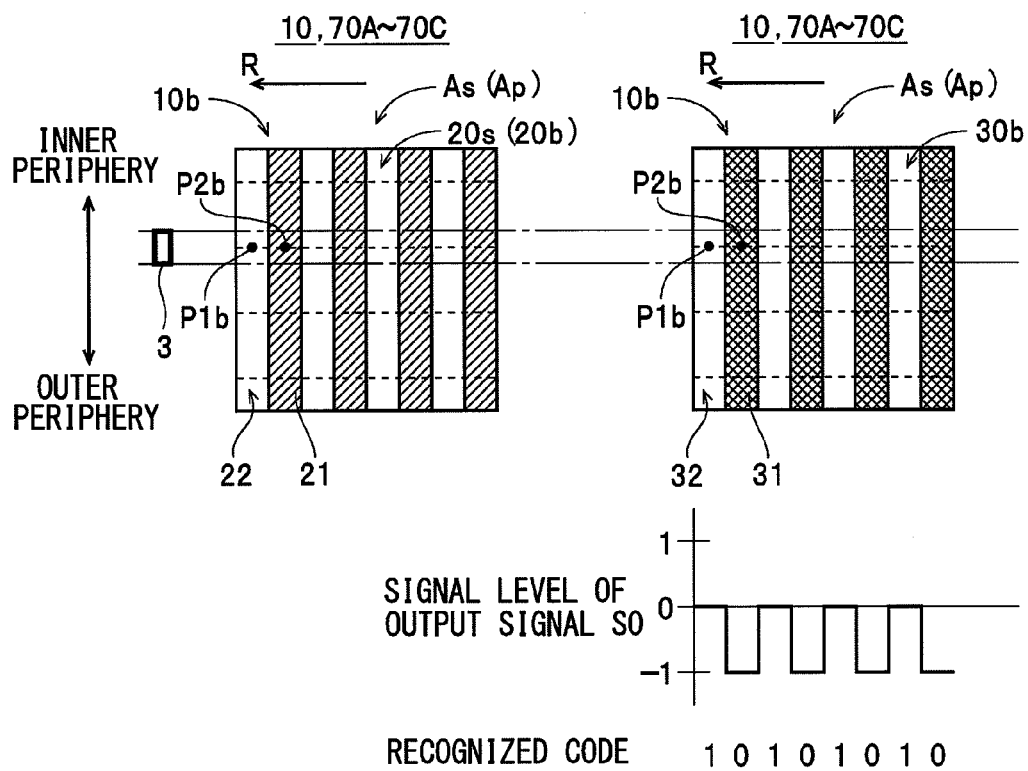
FIG. 13 is a diagram useful in explaining the relationship between (i) a servo pattern (concave/convex pattern) and magnetic pattern in a preamble pattern region on the second surface of a magnetic disk and (ii) a signal level of an output signal and recognized codes.

In this hard disk drive 1, the control unit 6 carries out tracking servo control using a single set of servo control data D inside the storage unit 7 during a recording/reproducing process for data on the first surface 10a of the magnetic disk 10 and during a reproducing process for recorded data on the second surface 10b. When doing so, on the magnetic disk 10 installed in the hard disk drive 1, as described earlier, in the preamble pattern regions Ap, the servo address mark regions Am, and the address pattern regions Aa, the formation positions of the convexes 21 and the concaves 22 are reversed on the first surface 10a and the second surface 10b. More specifically, as shown in FIGS. 12 and 13, in each preamble pattern region Ap on the first surface 10a, a convex 21 is formed at a position P1a corresponding to a position P1b where a concave 22 is formed in a preamble pattern region Ap on the second surface 10b, and a concave 22 is formed at a position P2a corresponding to a position P2b where a convex 21 is formed in a preamble pattern region Ap on the second surface 10b.

As a result, on the magnetic disk 10, in a magnetic pattern 30a (as one example, a pattern observed using an MFM (magnetic force microscope)) of a preamble pattern region Ap on the first surface 10a, the position P1a is recognized as a magnetic region 31 and the position P2a is recognized as a non-magnetic region 32, while in a magnetic pattern 30b of a preamble pattern region Ap on the second surface 10b, the position P1b is recognized as a non-magnetic region 32 and the position P2b is recognized as a magnetic region 31. Note that the expression "magnetic region" in the present specification refers to a region in a magnetic pattern that is recognized as having a magnetic field of a predetermined level or higher. Similarly, the expression "non-magnetic region" in the present specification refers to a region recognized as having a magnetic field of a lower intensity than the magnetic regions described above, or a region recognized as effectively not having a magnetic field.

Here, on the magnetic disk 10, as described earlier, all of the convexes 21 on the first surface 10a and the second surface 10b are DC magnetized in the same direction by the magnetizing apparatus (in this example, from the first surface 10a to the second surface 10b in the thickness direction of the magnetic disk 10). Accordingly, as shown in FIG. 12, when a magnetic head 3 passes a position on the first surface 10a shown by the dot-dash line (i.e., when the position on the first surface 10a shown by the dot-dash line passes below the magnetic head 3 in the direction of the arrow R due to the rotation of the magnetic disk 10), if the signal level of the output signal S0 outputted from the magnetic head 3 is "1" at the position P1a and "0" at the position P2a, as shown in FIG. 13, when the other magnetic head 3 passes the position on the second surface 10b shown by the dot-dash line (i.e., when the position on the second surface 10b shown by the dot-dash line passes below the other magnetic head 3 in the direction of the arrow R due to the rotation of the magnetic disk 10), the signal level of the output signal S0 outputted from the magnetic head 3 is "0" at the position P1b and "−1" at the position P2b.

Here, the detector unit 4a carries out a subtraction process on the output signals S0 outputted from the magnetic head 3 for both the first surface 10a and the second surface 10b and outputs a detection signal S1 that shows either "signal level 1 data present" or "signal level 0 data present". When doing so, for the first surface 10a, the detector unit 4a determines that "signal level 1 data present" when the signal level is "1", determines that "signal level 0 data present" when the signal level is "0", and outputs the detection signal S1. More specifically, for the output signal S0 (see FIG. 12) outputted from the magnetic head 3 on the first surface 10a side, as one example when an output signal S0 with the signal level "1" is outputted (i.e., when the magnetic head 3 outputs the output signal S0 above the position P1a), the detector unit 4a subtracts the signal level "0" from the signal level "1" and outputs a detection signal S1 with a signal level of "1 (absolute value)", while when an output signal S0 with the signal level "0" is outputted (i.e., when the magnetic head 3 outputs the output signal S0 above the position P2a), the detector unit 4a subtracts the signal level "0" from the signal level "0" and outputs a detection signal S1 with a signal level of "0 (absolute value)". Accordingly, as shown in FIG. 12, based on the detection signal S1 outputted from the detector unit 4a, the control unit 6 determines that the coded servo data "1" is recorded at the position P1a and that the coded servo data "0" is recorded at the position P2a.

In the same way, for the second surface 10b, the detector unit 4a determines that "signal level 1 data present" when the signal level is level "0", determines that "signal level 0 data present" when the signal level is level "−1", and outputs the detection signal S1. More specifically, for the output signal S0 outputted from the magnetic head 3 on the second surface 10b side, as one example when an output signal S0 with the signal level "0" is outputted (i.e., when the magnetic head 3 outputs the output signal S0 above the position P1b), the detector unit 4a subtracts the signal level "−1" from the signal level "0" and outputs a detection signal S1 with a signal level of "1 (absolute value)", while when an output signal S0 with the signal level "−1" is outputted (i.e., when the magnetic head 3 outputs the output signal S0 above the position P2b), the detector unit 4a subtracts the signal level "−1" from the signal level "−1" and outputs a detection signal S1 with a signal level of "0 (absolute value)". Accordingly, as shown in FIG. 13, based on the detection signal S1 outputted from the detector unit 4a, the control unit 6 determines that the coded servo data "1" is recorded at the position P1b and that the coded servo data "0" is recorded at the position P2b.

This means that regardless of the formation positions of the convexes 21 and the concaves 22 in the preamble pattern regions Ap being reversed on the first surface 10a and the second surface 10b of the magnetic disk 10, based on a single set of servo control data D, it is determined that the code "1" is recorded at the positions P1a, P1b that are the same formation position on the first surface 10a and the second surface 10b and the code "0" is recorded at the positions P2a, P2b that are the same formation position on the first surface 10a and the second surface 10b. By doing so, a base clock that corresponds to the rotational velocity of the magnetic disk 10 is obtained from the preamble pattern region Ap on both the first surface 10a and the second surface 10b. Note that since the extraction principles for servo data in the servo address mark regions Am are the same as those described for the preamble pattern region Ap described above, description thereof has been omitted.

Figure 14:
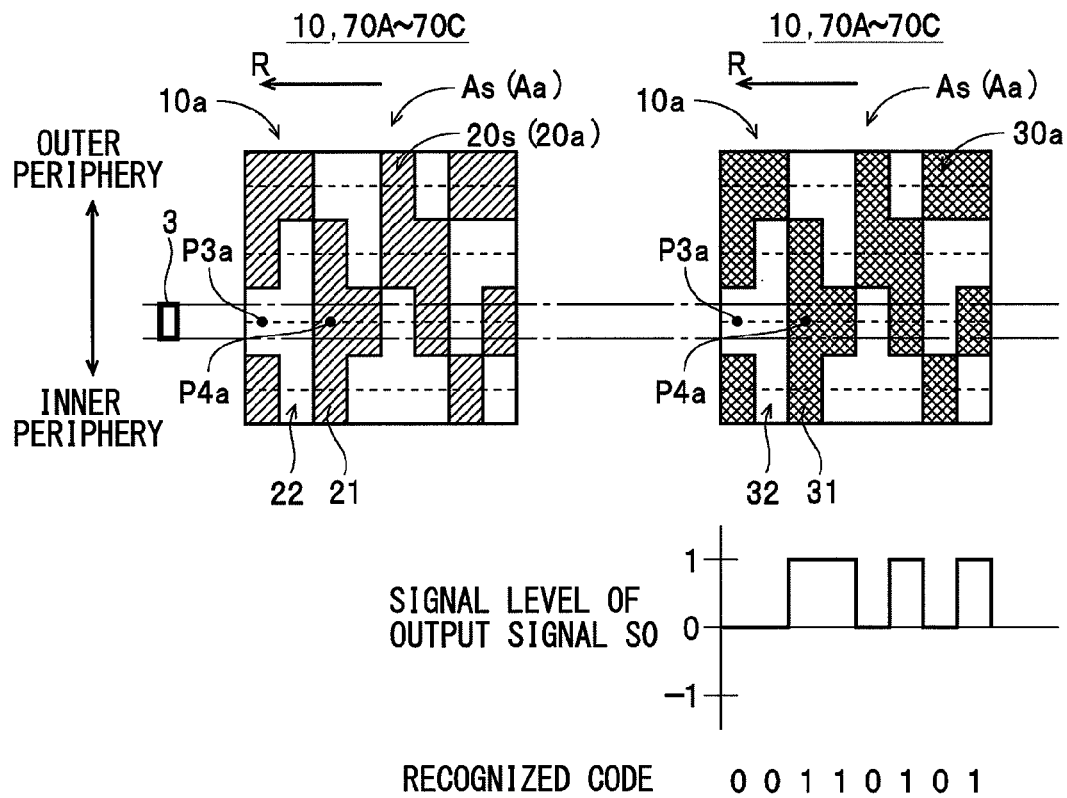
FIG. 14 is a diagram useful in explaining the relationship between (i) a servo pattern (concave/convex pattern) and magnetic pattern in an address pattern region on the first surface of a magnetic disk and (ii) a signal level of an output signal and recognized codes.
Figure 15:
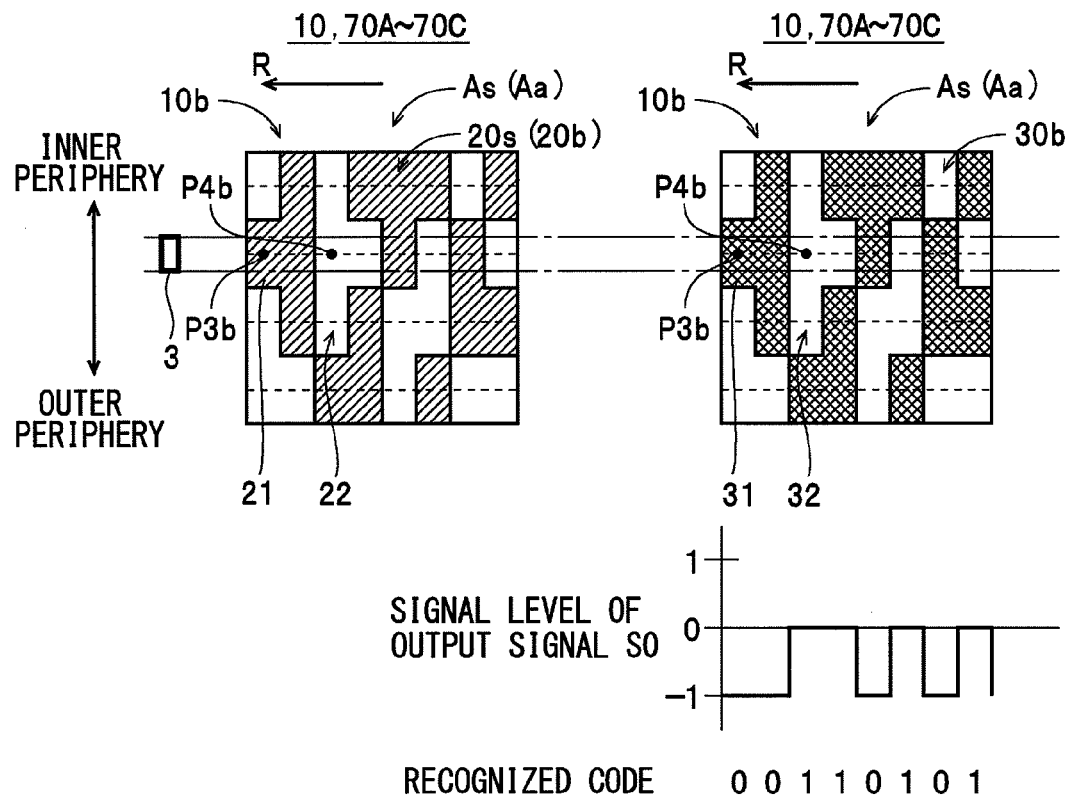
FIG. 15 is a diagram useful in explaining the relationship between (i) a servo pattern (concave/convex pattern) and magnetic pattern in an address pattern region on the second surface of a magnetic disk and (ii) a signal level of an output signal and recognized codes.

As shown in FIGS. 14 and 15, on the magnetic disk 10, in the address pattern region Aa on the first surface 10a, a concave 22 is formed at a position P3a corresponding to a position P3b at which a convex 21 is formed in an address pattern region Aa on the second surface 10b and a convex 21 is formed at a position P4a corresponding to a position P4b at which a concave 22 is formed in an address pattern region Aa on the second surface 10b. As a result, on the magnetic disk 10, in the magnetic pattern 30a in each address pattern region Aa on the first surface 10a, the position P3a is recognized as a non-magnetic region 32 and the position P4a is recognized as a magnetic region 31, but in a magnetic pattern 30b of an address pattern region Aa on the second surface 10b, the position P3b is recognized as a magnetic region 31 and the position P4b is recognized as a non-magnetic region 32.

Accordingly, as shown in FIG. 14, when a magnetic head 3 passes a position on the first surface 10a shown by the dot-dash line (i.e., when the position on the first surface 10a shown by the dot-dash line passes below the magnetic head 3 in the direction of the arrow R due to the rotation of the magnetic disk 10), in a case where the signal level of the output signal S0 outputted from the magnetic head 3 is "0" at the position P3a and "1" at the position P4a, as shown in FIG. 15, when the other magnetic head 3 passes a position on the second surface 10b shown by the dot-dash line (i.e., when a position on the second surface 10b shown by the dot-dash line passes below the other magnetic head 3 in the direction of the arrow R due to the rotation of the magnetic disk 10), the signal level of the output signal S0 outputted from the magnetic head 3 is "−1" at the position P3b and "0" at the position P4b.

Here, as described earlier, the detector unit 4a carries out a subtraction process on the output signals S0 outputted from the magnetic head 3 and outputs a detection signal S1 that shows either "signal level 1 data present" or "signal level 0 data present". Accordingly, as shown in FIG. 14, based on the detection signal S1 outputted from the detector unit 4a, the control unit 6 determines that the coded servo data "0" is recorded at the position P3a and that the coded servo data "1" is recorded at the position P4a. Also, as shown in FIG. 15, based on the detection signal S1 outputted from the detector unit 4a, the control unit 6 determines that the coded servo data "0" is recorded at the position P3b and that the coded servo data "1" is recorded at the position P4b. This means that regardless of the formation positions of the convexes 21 and the concaves 22 in the address pattern regions Aa being reversed on the first surface 10a and the second surface 10b of the magnetic disk 10, based on a single set of servo control data D, it is determined that the code "0" is recorded at the positions P3a, P3b that are the same formation position on the first surface 10a and the second surface 10b, and the code "1" is recorded at the positions P4a, P4b that are the same formation position on the first surface 10a and the second surface 10b. By doing so, the same address data is extracted from the address pattern region Aa for both the first surface 10a and the second surface 10b.

Figure 16:
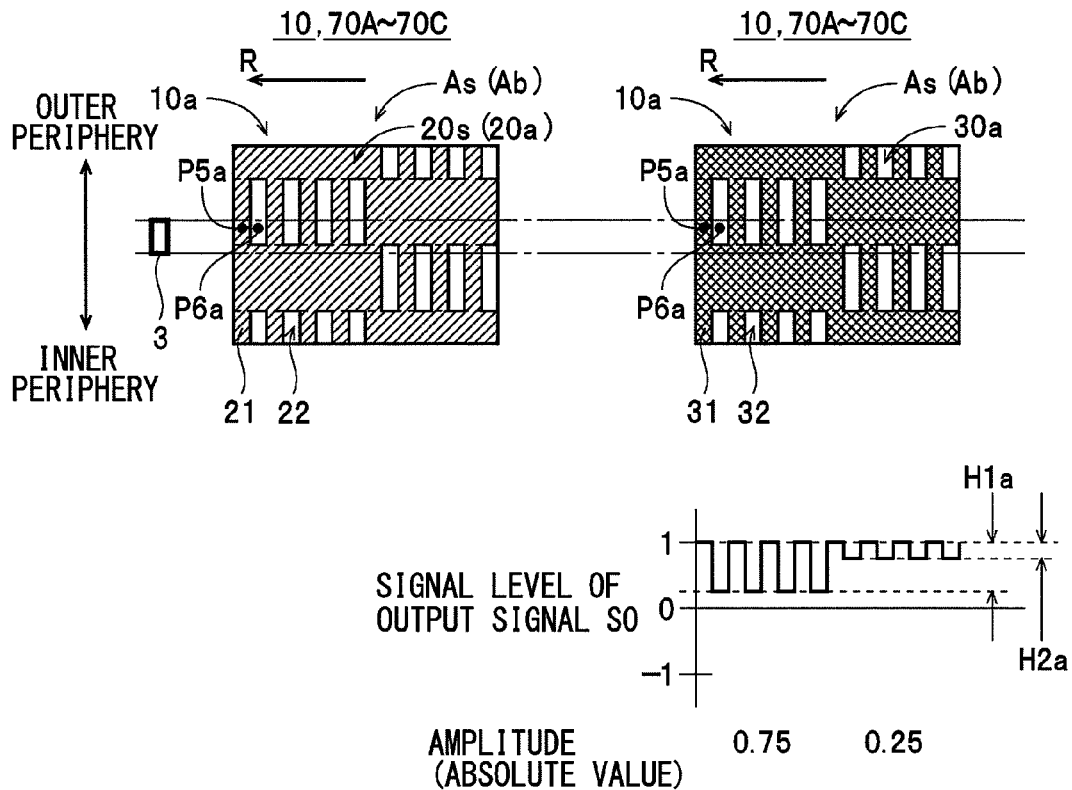
FIG. 16 is a diagram useful in explaining the relationship between (i) a servo pattern (concave/convex pattern) and magnetic pattern in a burst pattern region on the first surface of a magnetic disk and (ii) a signal level of an output signal and recognized amplitudes (absolute values)
Figure 17:
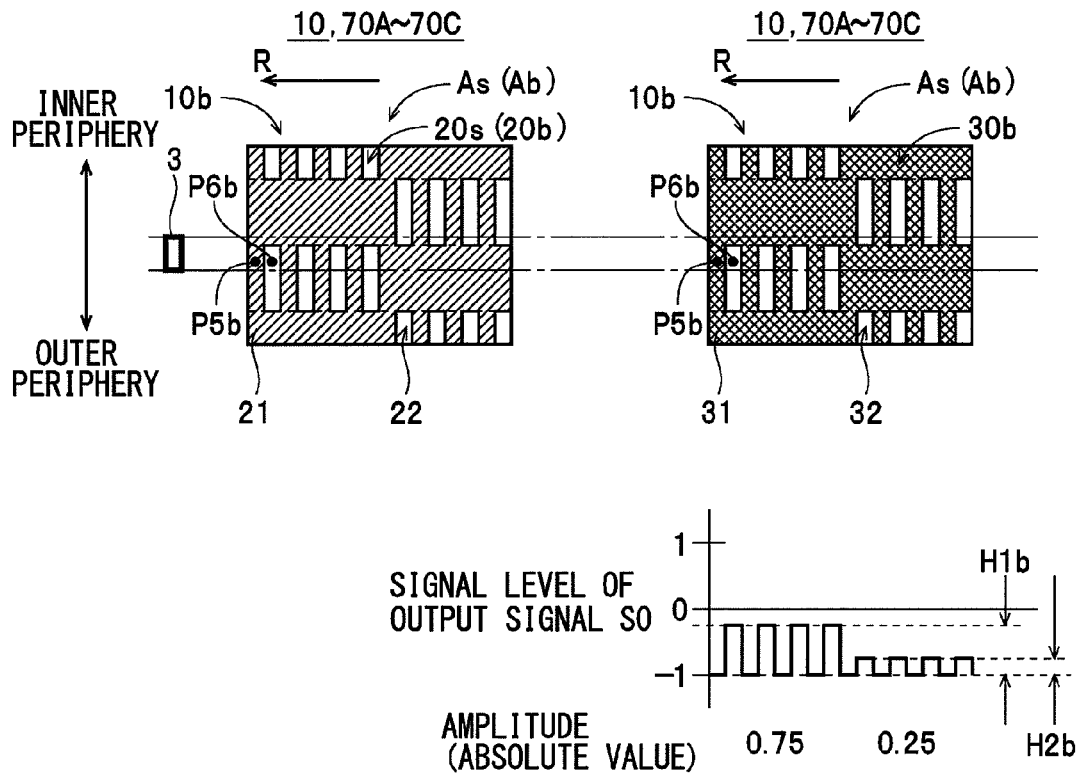
FIG. 17 is a diagram useful in explaining the relationship between (i) a servo pattern (concave/convex pattern) and magnetic pattern in a burst pattern region on the second surface of a magnetic disk and (ii) a signal level of an output signal and recognized amplitudes (absolute values)

In addition, on the magnetic disk 10 installed in the hard disk drive 1, as described earlier, the formation positions of the convexes 21 and the concaves 22 in the burst pattern regions Ab match on the first surface 10a and the second surface 10b. More specifically, as shown in FIGS. 16 and 17, on the magnetic disk 10, in a burst pattern region Ab on the first surface 10a, a convex 21 is formed at a position P5a corresponding to a position P5b at which a convex 21 is formed in the burst pattern region Ab on the second surface 10b and a concave 22 is formed at a position P6a corresponding to a position P6b at which a concave 22 is formed in a burst pattern region Ab on the second surface 10b. As a result, on the magnetic disk 10, in the magnetic pattern 30a of a burst pattern region Ab of the first surface 10a, the position P5a is recognized as a magnetic region 31 and the position P6a is recognized as a non-magnetic region 32 and in the same way, in the magnetic pattern 30b of a burst pattern region Ab on the second surface 10b, the position P5b is recognized as a magnetic region 31 and the position P6b is recognized as a non-magnetic region 32.

Accordingly, as shown in FIG. 16, when a magnetic head 3 passes a position on the first surface 10a shown by the dot-dash line (i.e., when a position on the first surface 10a shown by the dot-dash line passes below the magnetic head 3 in the direction of the arrow R due to the rotation of the magnetic disk 10), in a case where the signal level of the output signal S0 outputted from the magnetic head 3 is "1" at a position P5a and is "0.25", for example, at a position P6a, as shown in FIG. 17, when the other magnetic head 3 passes a position on the second surface 10b shown by the dot-dash line (i.e., when a position on the second surface 10b shown by the dot-dash line passes below the other magnetic head 3 in the direction of the arrow R due to the rotation of the magnetic disk 10), the signal level of the output signal S0 outputted from the magnetic head 3 is "−1" at a position P5b and is "−0.25" at a position P6b.

Here, each burst pattern formed in each burst pattern region Ab differs to a pattern where the output signal S0 is encoded to "1" or "0" codes based on a signal level thereof (an example of such pattern being "a pattern corresponding to encoded servo data" like the address pattern formed in an address pattern region Aa described earlier) and instead is constructed so that when the magnetic head 3 passes above a burst pattern region Ab (i.e., when a burst pattern region Ab passes below the magnetic head 3), the position of the magnetic head 3 above the magnetic disk 10 can be detected based on the magnitude (i.e., absolute value) of the amplitude of the output signal S0. Accordingly, when a burst pattern region Ab on the first surface 10a is passed, the detector unit 4a outputs absolute values (in this example, the level "0.75" and the level "0.25") of an amplitude H1a and an amplitude H2a (see FIG. 16) of the output signal S0 outputted from the magnetic head 3 as the detection signal S1, and when a burst pattern region Ab on the second surface 10b is passed, the detector unit 4a outputs absolute values (in this example, the level "0.75" and the level "0.25") of an amplitude H1b and an amplitude H2b (see FIG. 17) of the output signal S0 outputted from the magnetic head 3 as the detection signal S1.

On the other hand, based on the detection signal S1 outputted from the detector unit 4a, the control unit 6 calculates the position (offtrack distance) of the magnetic head 3 above the magnetic disk 10. More specifically, when the magnetic head 3 passes a burst pattern region Ab on the first surface 10a, based on the detection signal S1 outputted from the detector unit 4a (in this example, the level "0.75" and level "0.25"), the control unit 6 carries out a calculation of (0.75−0.25)/(0.75+0.25)=0.5/1 and specifies the position of the magnetic head 3 above the first surface 10a based on this 0.5/1 value and the servo control data D. Similarly, when the magnetic head 3 passes a burst pattern region Ab on the second surface 10b, based on the detection signal S1 outputted from the detector unit 4a (in this example, the same levels "0.75" and "0.25" as above), the control unit 6 carries out a calculation of (0.75−0.25)/(0.75+0.25)=0.5/1 and specifies the position of the magnetic head 3 above the second surface 10b based on this 0.5/1 value and the servo control data D.

As a result, in the hard disk drive 1, since the formation positions of the convexes 21 and the concaves 22 in the burst pattern regions Ab match on the first surface 10a and the second surface 10b of the magnetic disk 10, the positional relationship between the magnetic regions 31 and the non-magnetic regions 32 is the same in the magnetic patterns 30a, 30b. This means that regardless of the signal level of the output signal S0 when a convex 21 passes below the magnetic head 3 being reversed about a level "0" on the first surface 10a and the second surface 10b on the magnetic disk 10, when the displacement from a desired track center is the same on the first surface 10a and the second surface 10b, the control unit 6 can determine that the head position is displaced by the same displacement based on a single set of servo control data D. By doing so, on both the first surface 10a and the second surface 10b of the magnetic disk 10, the control unit 6 can make the magnetic head 3 on-track to a desired data recording track (i.e., a convex 21 inside a data recording region At) based on the extracted address data and information relating to the displacement of the magnetic head 3 and therefore can carry out a recording/reproducing process on the desired data recording track.

In this way, on the magnetic disk 10, in a servo pattern 20s (a concave/convex pattern 20a) formed in at least one region (in this example, the preamble pattern region Ap, the servo address mark region Am, and the address pattern region Aa) out of the plural functional regions inside each servo pattern region As on the first surface 10a (the "one surface"), concaves 22 (non-recording regions) are formed at formation positions on the first surface 10a corresponding to formation positions of convexes 21 (recording regions) of a servo pattern 20s (a concave/convex pattern 20b) on the second surface 10b (the "other surface"), and convexes 21 are formed at formation positions on the first surface 10a corresponding to formation positions of concaves 22 of a servo pattern 20s (a concave/convex pattern 20b) on the second surface 10b. The hard disk drive 1 includes the magnetic disk 10 described above, the magnetic heads 3 that carry out reads and writes of magnetic signals, the detector unit 4*a* that extracts servo data based on a read magnetic signal, and the control unit 6 that carries out tracking servo control for the magnetic heads based on the extracted servo data (an example where the "control unit" for the present invention is constructed of the detector unit 4*a* and the control unit 6).

Therefore, according to the magnetic disk 10 and the hard disk drive 1, by forming the convex magnetic portions (i.e., recording regions) and non-magnetic portions (i.e., non-recording regions) at matching positions on the one surface and the other surface of the magnetic disk and DC magnetizing the entire magnetic disk (i.e., both surfaces) in a single operation, unlike a conventional disk drive where a polarity reversing process needs to be carried out on reproducing signals during the reading of a servo pattern from a servo pattern region, even if the entire magnetic disk 10 is DC magnetized in a single operation, it will be possible to extract servo data from both the first surface 10*a* and the second surface 10*b* without carrying out a polarity reversing process on the reproducing signals. Accordingly, high-speed recording and reproducing can be carried out on both the first surface 10*a* and the second surface 10*b* of the magnetic disk 10.

In addition, on the magnetic disk 10, a functional region where a pattern is formed corresponding to encoded servo data (in this example, the preamble pattern region Ap, the servo address mark region Am, and the address pattern region Aa) is set as "at least one region" for the present invention, and in the servo pattern 20*s* formed in the functional region described above on the first surface 10*a*, concaves 22 are formed at formation positions on the first surface 10*a* corresponding to formation positions of convexes 21 that construct servo data on the second surface 10*b* and convexes 21 are formed at formation positions on the first surface 10*a* corresponding to formation positions of concaves 22 that construct the servo data on the second surface 10*b*. Also, with the hard disk drive 1, the servo data is extracted by the detector unit 4*a* carrying out a subtraction process or a differential process on the output signal S0 outputted from the magnetic head 3 when a magnetic signal is read from functional regions (in this example, the preamble pattern regions Ap, the servo address mark regions Am, and the address pattern regions Aa) where a servo pattern 20*s* (a concave/convex pattern 20*a*) is formed corresponding to the encoded servo data.

Therefore, according to the magnetic disk 10 and the hard disk drive 1, there is no need to provide servo control data (a control program) and a servo control circuit separately for each of the first surface 10*a* and the second surface 10*b* of the magnetic disk 10 or to carry out a magnetization process separately on the first surface 10*a* and the second surface 10*b* of the magnetic disk 10, and servo data can be extracted from the first surface 10*a* and the second surface 10*b* respectively of the magnetic disk 10 using a single set of servo control data D (and a single servo control circuit). By doing so, it is possible to sufficiently reduce the manufacturing cost of the hard disk drive 1.

In addition, on the magnetic disk 10, in the servo patterns 20*s* (the concave/convex pattern 20*a*) formed in each burst pattern region Ab out of the plural functional regions on the first surface 10*a*, convexes 21 are formed at formation positions on the first surface 10*a* corresponding to formation positions of convexes 21 in the servo patterns 20*s* (the concave/convex pattern 20*b*) on the second surface 10*b*, and concaves 22 are formed at formation positions on the first surface 10*a* corresponding to formation positions of concaves 22 in the servo patterns 20*s* (the concave/convex pattern 20*b*) on the second surface 10*b*. Therefore, according to the magnetic disk 10, in the burst pattern regions Ab where there is a great difference in the ratio of the area of the convexes 21 to the area of the concaves 22, it is possible to set the ratio equal on both surfaces of the magnetic recording medium so that the processing conditions during manufacturing can be set equal for both the first surface 10*a* and the second surface 10*b* of a magnetic disk.

More specifically, during the process that forms resin masks using the stampers 40*a*, 40*b* for manufacturing the magnetic disk 10, since it is possible to carry out an imprinting process according to the same imprinting conditions on both the first surface 10*a* and the second surface 10*b* of the preform 60, it is possible to form resin masks with concaves of the same depth (or convexes of the same height) on both the first surface 10*a* and the second surface 10*b*. Accordingly, since it is possible to set the processing time required to remove residue equal on both the first surface 10*a* and the second surface 10*b* of the preform 60, it is possible to make the extent to which the concaves deform (which would differ if the processing time were different) equal on the first surface 10*a* and the second surface 10*b*. As a result, it is possible to form the servo patterns 20*s* inside the burst pattern regions Ab with the same precision on the first surface 10*a* and the second surface 10*b* of the magnetic disk 10. Also, when forming the concave/convex patterns 20 in the magnetic layers 14 by etching using the resin masks, the etching conditions can be set equal for both the first surface 10*a* and the second surface 10*b* of the preform 60, and as a result it is easy to etch the first surface 10*a* and the second surface 10*b* simultaneously, for example.

Also, the stamper 40*a* described above are composed of a pair of stampers that are the stamper 40*a* ("first stamper") on which is formed the concave/convex pattern 50*a* including the concaves 52 formed corresponding to the convexes 21 of the concave/convex pattern 20*a* on the first surface 10*a* of the magnetic disk 10 described above and the convexes 51 formed corresponding to the concaves 22 of the concave/convex pattern 20*a* on the first surface 10*a* and the stamper 40*b* ("second stamper") on which is formed the concave/convex pattern 50*b* including the convexes 51 formed corresponding to the concaves 22 of the concave/convex pattern 20*b* on the second surface 10*b* and the convexes 51 formed corresponding to the concaves 22 of the concave/convex pattern 20*b* on the second surface 10*b*. Accordingly, by using the stampers 40*a*, 40*b*, it is possible to easily manufacture, by imprinting or the like, the magnetic disk 10 where servo data can be extracted (without carrying out a polarity reversing process on the reproducing signal) from the first surface 10*a* and the second surface 10*b*, even when the entire magnetic disk 10 has been DC magnetized in a single operation.

Note that the present invention is not limited to the construction and method described above. For example, although an example magnetic disk 10 has been described where the formation positions of the convexes 21 and the concaves 22 in the preamble pattern regions Ap, the servo address mark regions Am, and the address pattern regions Aa are reversed and the formation positions of the convexes 21 and the concaves 22 in the burst pattern regions Ab match on the first surface 10*a* and the second surface 10*b*, when burst patterns are constructed so that the position of the magnetic head 3 above the magnetic disk 10 is detected based on the magnitude (absolute value) of the amplitude of the output signal S0 for example, it will be possible to detect the position of the magnetic head 3 even if the formation positions of the convexes 21 and the concaves 22 do not match. Therefore, it is also possible to form the concave/convex patterns 20*a*, 20*b* so that the formation positions of the convexes 21 and the concaves 22 are reversed on the first surface 10a and the second surface 10b in the burst pattern regions Ab in the same way as in the preamble pattern regions Ap and the like.

Also, the "regions where a pattern is formed corresponding to encoded servo data" are not limited to the preamble pattern regions Ap, the servo address mark regions Am, and the address pattern regions Aa on the magnetic disk 10 described earlier, and may include various functional regions such as terminal pattern regions and parity pattern regions. Accordingly, when such regions are present on the magnetic disk, the formation positions of the convexes 21 and the concaves 22 therein should preferably be reversed on the first surface 10a and the second surface 10b in the same way as the preamble pattern regions Ap, the servo address mark regions Am, and the address pattern regions Aa on the first surface 10a and the second surface 10b of the magnetic disk 10.

Also, although the hard disk drive 1 described above is constructed so that the detector unit 4a carries out a subtraction process on the output signal S0 from the magnetic head 3 and outputs the detection signal S1, the construction of the control unit for the present invention is not limited to such. For example, it is possible to use a construction where the detector unit 4a carries out a differential process on the output signal S0 and outputs a detection signal corresponding to the processing result and the control unit 6 extracts the servo data based on the detection signal (the signal subjected to the differential process).

Figure 18:
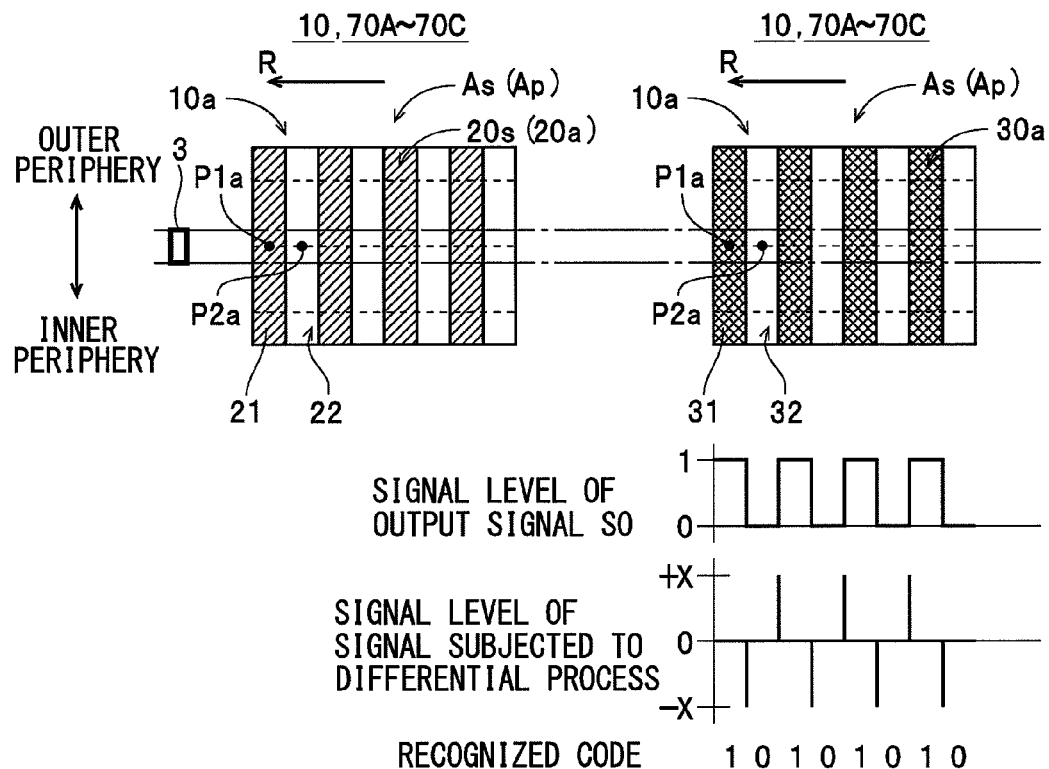
FIG. 18 is a diagram useful in explaining the relationship between (i) a servo pattern (concave/convex pattern) and magnetic pattern in a preamble pattern region on the first surface of a magnetic disk and (ii) a signal level of an output signal, a signal level of a signal subjected to a differential process and recognized codes.

When this construction is used, as shown in FIG. 18, for the output signal S0 outputted from the magnetic head 3 on the first surface 10a side, the detector unit 4a carries out a differential process on the output signal S0 so that when an output signal S0 with a constant signal level of "1" is outputted (i.e., when the magnetic head 3 is outputting the output signal S0 above the position P1a), the detection signal S1 is outputted with the signal level "0", and when the signal level of the output signal S0 changes from "1" to "0", the detection signal S1 is outputted with a "predetermined minus level" (in FIG. 18, "−X"). Similarly, when an output signal S0 with a constant signal level of "0" is outputted (i.e., when the magnetic head 3 is outputting the output signal S0 above the position P2a), the detection signal S1 is outputted with the signal level "0", and when the signal level of the output signal S0 changes from "0" to "1", the detection signal S1 is outputted with a "predetermined plus level" (in FIG. 18, "+X").

Figure 19:
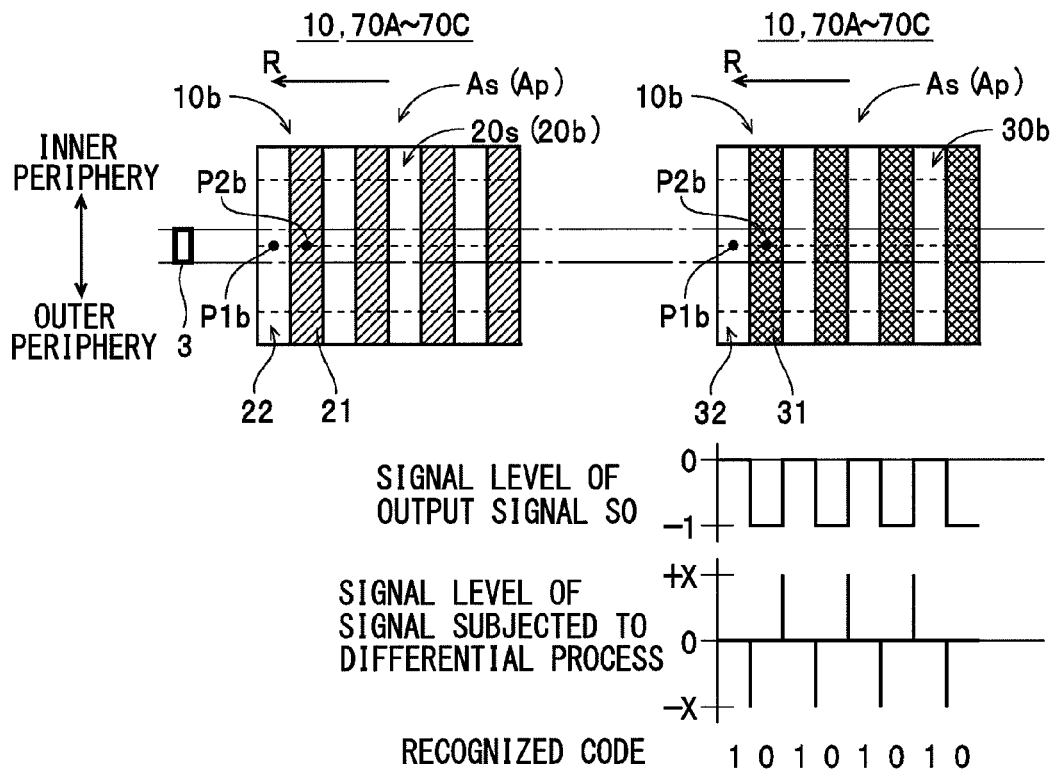
FIG. 19 is a diagram useful in explaining the relationship between (i) a servo pattern (concave/convex pattern) and magnetic pattern in a preamble pattern region on the second surface of a magnetic disk and (ii) a signal level of an output signal, a signal level of a signal subjected to a differential process and recognized codes.

On the other hand, as shown in FIG. 19, for the output signal S0 outputted from the magnetic head 3 on the second surface 10b side, the detector unit 4a carries out a differential process on the output signal S0 so that when an output signal S0 with a constant signal level of "0" is outputted (i.e., when the magnetic head 3 is outputting the output signal S0 above the position P1b), the detection signal S1 is outputted with the signal level "0", and when the signal level of the output signal S0 changes from "0" to "−1", the detection signal S1 is outputted with a "predetermined minus level (in FIG. 19, "−X"). Similarly, when an output signal S0 with a constant signal level of "−1" is outputted (i.e., when the magnetic head 3 is outputting the output signal S0 above the position P2b), the detection signal S1 is outputted with the signal level "0", and when the signal level of the output signal S0 changes from "−1" to "0", the detection signal S1 is outputted with a "predetermined plus level (in FIG. 19, "+X").

In this case, the control unit 6 determines that a servo data code "1" is recorded at a position where the magnetic head 3 is located from a time when the detection signal S1 with the "predetermined plus level" is outputted from the detector unit 4a to a time when the detection signal S1 with the "predetermined minus level" is outputted from the detector unit 4a. Similarly, the control unit 6 determines that a servo data code "0" is recorded at a position where the magnetic head 3 is located from a time when the detection signal S1 with the "predetermined minus level" is outputted from the detector unit 4a to a time when the detection signal S1 with the "predetermined plus level" is outputted from the detector unit 4a. Accordingly, based on the detection signal S1 outputted from the detector unit 4a, the control unit 6 determines that the servo data code "1" is recorded at the position P1a, that the servo data code "0" is recorded at the position P2a, that the servo data code "1" is recorded at the position P1b, and that the servo data code "0" is recorded at the position P2b. In this way, even in a construction where the servo data is extracted by a differential process, in the same way as the hard disk drive 1 described earlier, it is possible to extract the servo data from both the first surface 10a and the second surface 10b of the magnetic disk 10 based on a single set of servo control data D.

In addition, although the magnetic disk 10 where the entire regions from the protruding end parts to the base end parts of the convexes 21 in the concave/convex patterns 20a, 20b (i.e., the data track patterns 20t and the servo patterns 20s) are formed by the magnetic layers 14 (i.e., the magnetic material) has been described as an example, the construction of the magnetic recording medium according to the present invention is not limited to this. More specifically, as one example, it is also possible to construct the data track patterns 20t and the servo patterns 20s of concave/convex patterns 20a, 20b that include convexes 21 where only the protruding end parts of the convexes 21 are formed of the magnetic layers 14 and the base end parts of the convexes 21 are formed of the intermediate layers 13 and/or the soft magnetic layers 12, and concaves 22 whose base surfaces are formed in the thickness of the intermediate layers 13 and/or the soft magnetic layers 12.

Figure 20:
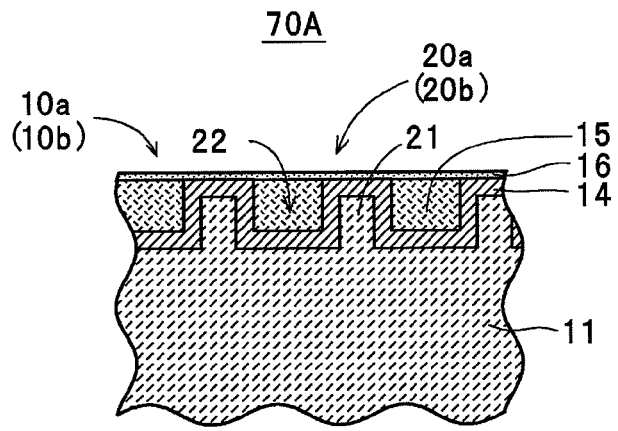
FIG. 20 is a cross-sectional view of a magnetic disk according to another embodiment.
Figure 21:
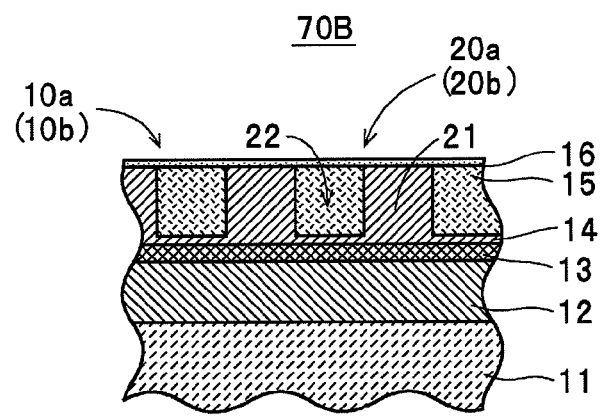
FIG. 21 is a cross-sectional view of a magnetic disk according to yet another embodiment.

Also, like a magnetic disk 70A shown in FIG. 20, for example, by forming the magnetic layers 14 so as to cover concave/convex patterns formed in the glass base plate 11 (i.e., concave/convex patterns where the convexes and concaves have the same formation positions as in the concave/convex patterns 20a, 20b), it is possible to construct the concave/convex patterns 20a, 20b (i.e., the data track patterns 20t and the servo patterns 20s) of plural convexes 21 whose surfaces are formed of magnetic material and plural concaves 22 whose bottom surfaces are also formed of the magnetic material. Also, like a magnetic disk 70B shown in FIG. 21, it is possible to construct the concave/convex patterns 20a, 20b so that not only the convexes 21 but also the bottom parts of the concaves 22 are formed of the magnetic layers 14.

Figure 22:
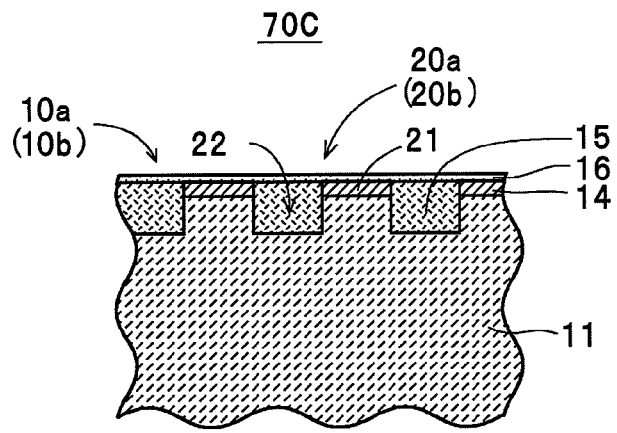
FIG. 22 is a cross-sectional view of a magnetic disk according to yet another embodiment.

As another example, like a magnetic disk 70C shown in FIG. 22, it is also possible to construct the concave/convex patterns 20a, 20b so as to include plural convexes 21 where only the protruding end parts of the convexes 21 are formed of the magnetic layer 14 and the base end parts of the convexes 21 are formed of a non-magnetic material or a soft magnetic material (in the illustrated example, the glass base plate 11). Here, for the magnetic disk 70C shown in FIG. 22, only the protruding end parts of the convexes 21 are formed of the magnetic layer 14, but it is also possible to use a construction where the magnetic layer 14 is also formed on the base surfaces of the concaves 22 between adjacent convexes 21 (a construction where the magnetic layer 14 is not present on the side surfaces of the convexes 21 on the magnetic disk 70A described earlier: not shown).

In addition, it is also possible to construct a magnetic disk (not shown) by filling concaves formed in a layer of non-magnetic material with the magnetic material that constructs the magnetic layer 14 described above and setting the positions of the convexes in the layer of the non-magnetic material as the non-recording regions (i.e., regions corresponding to the concaves 22 of the magnetic disk 10 and the like) and positions of the magnetic material filled inside the concaves as the recording regions (i.e., regions corresponding to the convexes 21 of the magnetic disk 10 and the like). It is also possible to construct a magnetic disk (not shown) by selectively modifying desired regions in a layer of magnetic material to form regions whose ability to store a magnetic signal in a readable manner is lower than the periphery thereof or regions that effectively do not have such an ability, setting regions whose ability to store a magnetic signal in a readable manner is high as the recording regions (i.e., regions corresponding to the convexes 21 of the magnetic disk 10 and the like), and setting regions whose ability to store a magnetic signal in a readable manner is low as non-recording regions (i.e., regions corresponding to the concaves 22 of the magnetic disk 10 and the like)(not shown).

In addition, although examples have been described where both the data track patterns 20*t* and the servo patterns 20*s* are comprised of the concave/convex patterns 20*a*, 20*b*, having convexes 21 and concaves 22, the magnetic recording medium according to the present invention is not limited to such and it is possible to achieve a construction that is capable of recording and reproducing data by forming the servo pattern 20*s* of the concave/convex patterns 20*a*, 20*b*, inside the servo pattern regions As and forming a continuous magnetic film (a smooth magnetic layer 14 with no concaves and convexes) inside the data recording regions At.

What is claimed is:

1. A rotary-type magnetic recording medium where servo patterns are formed in servo pattern regions on one surface and another surface of a disk-shaped substrate by patterns including recording regions and non-recording regions, wherein in the servo pattern regions on both the one surface and the other surface, plural functional regions are defined in order in a direction of rotation of the magnetic recording medium, and in the pattern formed in at least one region out of the plural functional regions on the one surface, the non-recording regions are formed at formation positions on the one surface corresponding to formation positions of all of the recording regions on the other surface and the recording regions are formed at formation positions on the one surface corresponding to formation positions of all of the non-recording regions on the other surface.

2. The magnetic recording medium according to claim 1, wherein the functional regions where the pattern is formed corresponding to encoded servo data is set as the at least one region and in the pattern formed in the functional regions where the pattern is formed corresponding to the encoded servo data on the one surface, the non-recording regions are formed at formation positions on the one surface corresponding to formation positions of all of the recording regions that construct the servo data on the other surface and the recording regions are formed at formation positions on the one surface corresponding to formation positions of all of the non-recording regions that construct the servo data on the other surface.

3. The magnetic recording medium according to claim 1, wherein in the pattern formed in each burst pattern region out of the plural functional regions on the one surface, the recording regions are formed at formation positions on the one surface corresponding to formation positions of all of the recording regions on the other surface and the non-recording regions are formed at formation positions on the one surface corresponding to formation positions of all of the non-recording regions on the other surface.

4. A recording/reproducing apparatus comprising:

the magnetic recording medium according to claim 1;

a magnetic head that carries out a read of a magnetic signal from the magnetic recording medium and a write of a magnetic signal onto the magnetic recording medium; and a control unit that extracts servo data based on the magnetic signal read from the servo pattern regions of the magnetic recording medium and carries out tracking servo control of the magnetic head based on the extracted servo data.

5. The recording/reproducing apparatus according to claim 4, wherein the control unit extracts the servo data by carrying out one of a subtraction process and a differential process on an output signal outputted from the magnetic head when the magnetic signal is read from the functional region where the pattern is formed corresponding to encoded servo data.

6. A pair of stampers for manufacturing the magnetic recording medium according to claim 1, comprising:

a first stamper on which is formed a concave/convex pattern with concaves formed corresponding to the recording regions in the pattern on the one surface of the magnetic recording medium and convexes formed corresponding to the non-recording regions in the pattern on the one surface of the magnetic recording medium; and a second stamper on which is formed a concave/convex pattern with concaves formed corresponding to the recording regions in the pattern on the other surface of the magnetic recording medium and convexes formed corresponding to the non-recording regions in the pattern on the other surface of the magnetic recording medium.

7. The magnetic recording medium according to claim 1, wherein data track patterns are formed on the one surface and the other surface of the substrate by patterns including the recording regions and the non-recording regions, wherein in the data tack patterns on the one surface, the recording regions are formed at formation positions on the one surface corresponding to formation positions of all of the recording regions in the data track patterns on the other surface and the non-recording regions are formed at formation positions on the one surface corresponding to formation positions of all of the non-recording regions in the data track patterns on the other surface.

* * * * *